US010862661B2

(12) United States Patent
Brunel et al.

(10) Patent No.: US 10,862,661 B2
(45) Date of Patent: *Dec. 8, 2020

(54) RADIO FREQUENCY COMMUNICATION SYSTEMS WITH DYNAMIC WAVEFORM CONTROL AND POWER BOOST

(71) Applicant: Skyworks Solutions, Inc., Irvine, CA (US)

(72) Inventors: Dominique Michel Yves Brunel, Antibes (FR); David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,857

(22) Filed: Aug. 30, 2019

(65) Prior Publication Data
US 2020/0099502 A1    Mar. 26, 2020

Related U.S. Application Data

(63) Continuation of application No. 15/972,487, filed on May 7, 2018, now Pat. No. 10,439,789.

(60) Provisional application No. 62/503,216, filed on May 8, 2017, provisional application No. 62/521,991, filed on Jun. 19, 2017.

(51) Int. Cl.
*H04L 5/14*     (2006.01)
*H04L 27/36*    (2006.01)
*H04L 27/26*    (2006.01)

(52) U.S. Cl.
CPC .............. *H04L 5/14* (2013.01); *H04L 5/1469* (2013.01); *H04L 27/2602* (2013.01); *H04L 27/2605* (2013.01); *H04L 27/2614* (2013.01); *H04L 27/36* (2013.01)

(58) Field of Classification Search
None
See application file for complete search history.

(56) References Cited

U.S. PATENT DOCUMENTS

| | | | |
|---|---|---|---|
| 10,439,789 B2 * | 10/2019 | Brunel | ..................... H04L 5/14 |
| 2014/0146754 A1 | 5/2014 | Bayesteh et al. | |
| 2015/0256320 A1 * | 9/2015 | Feng | ................... H04W 74/004 370/280 |
| 2018/0049233 A1 * | 2/2018 | Luo | ........................ H04W 72/14 |
| 2018/0092086 A1 | 3/2018 | Nammi et al. | |
| 2018/0092095 A1 * | 3/2018 | Zeng | ..................... H04L 5/0007 |
| 2018/0139785 A1 | 5/2018 | Zhang et al. | |

* cited by examiner

*Primary Examiner* — Kouroush Mohebbi
(74) *Attorney, Agent, or Firm* — Knobbe, Martens, Olson & Bear, LLP

(57) ABSTRACT

Radio frequency (RF) communication systems with dynamic waveform control and power boost are provided herein. In certain embodiments, an RF communication system includes a power amplifier configured to amplify an RF signal to generate an RF transmit signal for transmission over a time-division duplex (TDD) communication link having a duty cycle, and a transmitter configured to provide the RF signal to the power amplifier. The transmitter is operable to change a type of waveform of the RF signal from a first waveform type to a second waveform type in response to a decrease in a signal-to-noise ratio (SNR) of the TDD communication link, and to boost a power of the RF transmit signal by an amount based on the duty cycle.

20 Claims, 14 Drawing Sheets

RADIO FREQUENCY COMMUNICATION SYSTEMS WITH DYNAMIC WAVEFORM CONTROL AND POWER BOOST

CROSS-REFERENCE TO RELATED APPLICATIONS

This application is a continuation of U.S. application Ser. No. 15/972,487, filed May 7, 2018 and titled "RADIO FREQUENCY COMMUNICATION SYSTEMS WITH DYNAMIC WAVEFORM CONTROL AND POWER BOOST" which claims the benefit of priority under 35 U.S.C. § 119 of U.S. Provisional Patent Application No. 62/521,991, filed Jun. 19, 2017 and titled "RADIO FREQUENCY SYSTEMS WITH DYNAMIC WAVEFORM CONTROL AND POWER BOOST," and of U.S. Provisional Patent Application No. 62/503,216, filed May 8, 2017 and titled "RADIO FREQUENCY SYSTEMS WITH DYNAMIC WAVEFORM CONTROL," each of which are herein incorporated by reference in their entirety.

BACKGROUND

Field

Embodiments of the invention relate to electronic systems, and in particular, to radio frequency (RF) electronics.

Description of the Related Technology

RF communication systems can be used for transmitting and receiving signals of a wide range of frequencies. For example, an RF communication system can be used to wirelessly communicate RF signals in a frequency range of about 30 kHz to 300 GHz, such as in the range of about 450 MHz to about 30 GHz for certain communications standards.

Examples of RF communication systems include, but are not limited to, mobile phones, tablets, customer-premises equipment (CPE), laptops, and wearable electronics.

SUMMARY

In certain embodiments, the present disclosure relates to a radio frequency communication system. The radio frequency communication system includes a power amplifier configured to amplify a radio frequency signal to generate a radio frequency transmit signal for transmission over a time-division duplex communication link having a duty cycle, and a transmitter configured to provide the radio frequency signal to the power amplifier, the transmitter operable to change a type of waveform of the radio frequency signal from a first waveform type to a second waveform type in response to a decrease in a signal-to-noise ratio of the time-division duplex communication link, and to boost a power of the radio frequency transmit signal by an amount based on the duty cycle.

In various embodiments, the time-division duplex communication link includes a plurality of available transmit frames, the radio frequency communication system further operable to select the amount of boost based on a number of utilized transmit frames in which the transmitter transmits the radio frequency transmit signal. According to several embodiments, the transmitter is further operable to decrease the number of utilized transmit frames and to increase the amount of boost.

In a number of embodiments, the transmitter is further configured to select the amount of boost based on a specific absorption rate value.

In several embodiments, the second waveform type has lower peak to average power ratio than the first waveform type.

In various embodiments, the second waveform type includes discrete Fourier transformation spreading and the first waveform type includes a cyclic prefix coding.

In some embodiments, the first waveform type is modulated with quadrature phase shift keying and the second waveform type is modulated with binary phase shift keying.

In certain embodiments, the present disclosure relates to a method of wireless communication. The method includes generating a radio frequency signal using a transmitter of a radio frequency communication system, transmitting the radio frequency signal over a time-division duplex communication link having a duty cycle, and in response to a decrease in a signal-to-noise ratio of the time-division duplex communication link, boosting a power of the radio frequency transmit signal by an amount based on the duty cycle and changing a type of waveform of the radio frequency signal from a first waveform type to a second waveform type.

In some embodiments, the time-division duplex communication link includes a plurality of available transmit frames, the method further comprising selecting the amount of boost based on a number of utilized transmit frames in which the radio frequency signal is transmitted. According to various embodiments, the method further includes decreasing the number of utilized transmit frames and increasing the amount of boost.

In a number of embodiments, the method further includes selecting the amount of boost based on a specific absorption rate value.

In several embodiments, the second waveform type has lower peak to average power ratio than the first waveform type.

In some embodiments, the first waveform type is modulated with quadrature phase shift keying and the second waveform type is modulated with binary phase shift keying.

In certain embodiments, the present disclosure relates to a module for a radio frequency communication system, the module includes a laminated substrate, and one or more semiconductor dies attached to the laminated substrate. The one or more semiconductor dies include a power amplifier configured to amplify a radio frequency signal to generate a radio frequency transmit signal for transmission over a time-division duplex communication link having a duty cycle, and a transmitter configured to provide the radio frequency signal to the power amplifier. The transmitter is operable to change a type of waveform of the radio frequency signal from a first waveform type to a second waveform type in response to a decrease in a signal-to-noise ratio of the time-division duplex communication link, and to boost a power of the radio frequency transmit signal by an amount based on the duty cycle.

In various embodiments, the time-division duplex communication link includes a plurality of available transmit frames, the transmitter further operable to select the amount of boost based on a number of utilized transmit frames in which the radio frequency transmit signal is transmitted.

In several embodiments, the transmitter is further operable to decrease the number of utilized transmit frames and to increase the amount of boost.

In a number of embodiments, the transmitter is further operable to select the amount of boost based on a specific absorption rate value.

In some embodiments, the second waveform type has lower peak to average power ratio than the first waveform type.

In various embodiments, the second waveform type includes discrete Fourier transformation spreading and the first waveform type includes a cyclic prefix coding.

In several embodiments, the first waveform type is modulated with quadrature phase shift keying and the second waveform type is modulated with binary phase shift keying.

In certain embodiments, the present disclosure relates to an RF communication system includes a power amplifier that amplifies an RF signal to generate an RF transmit signal for transmission over communication link, and a transmitter that provides the RF signal to the power amplifier. The transmitter is operable to control a resource block allocation of the RF signal to an inner resource block allocation in response to a decrease in a signal-to-noise ratio (SNR) of the communication link, and to boost a power of the RF transmit signal.

In certain embodiments, the present disclosure relates to a method of wireless communication. The method includes generating a radio frequency signal using a transmitter of a radio frequency communication system, transmitting the radio frequency signal over a communication link, and in response to a decrease in a signal-to-noise ratio of the communication link, controlling a resource block allocation of the RF signal to an inner resource block allocation and boosting a power of the radio frequency transmit signal.

In certain embodiments, the present disclosure relates to a module for a radio frequency communication system, the module includes a laminated substrate, and one or more semiconductor dies attached to the laminated substrate. The one or more semiconductor dies include a power amplifier configured to amplify a radio frequency signal to generate a radio frequency transmit signal for transmission over a communication link, and a transmitter configured to provide the radio frequency signal to the power amplifier. The transmitter is operable control a resource block allocation of the RF signal to an inner resource block allocation in response to a decrease in a signal-to-noise ratio (SNR) of the communication link, and to boost a power of the RF transmit signal.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
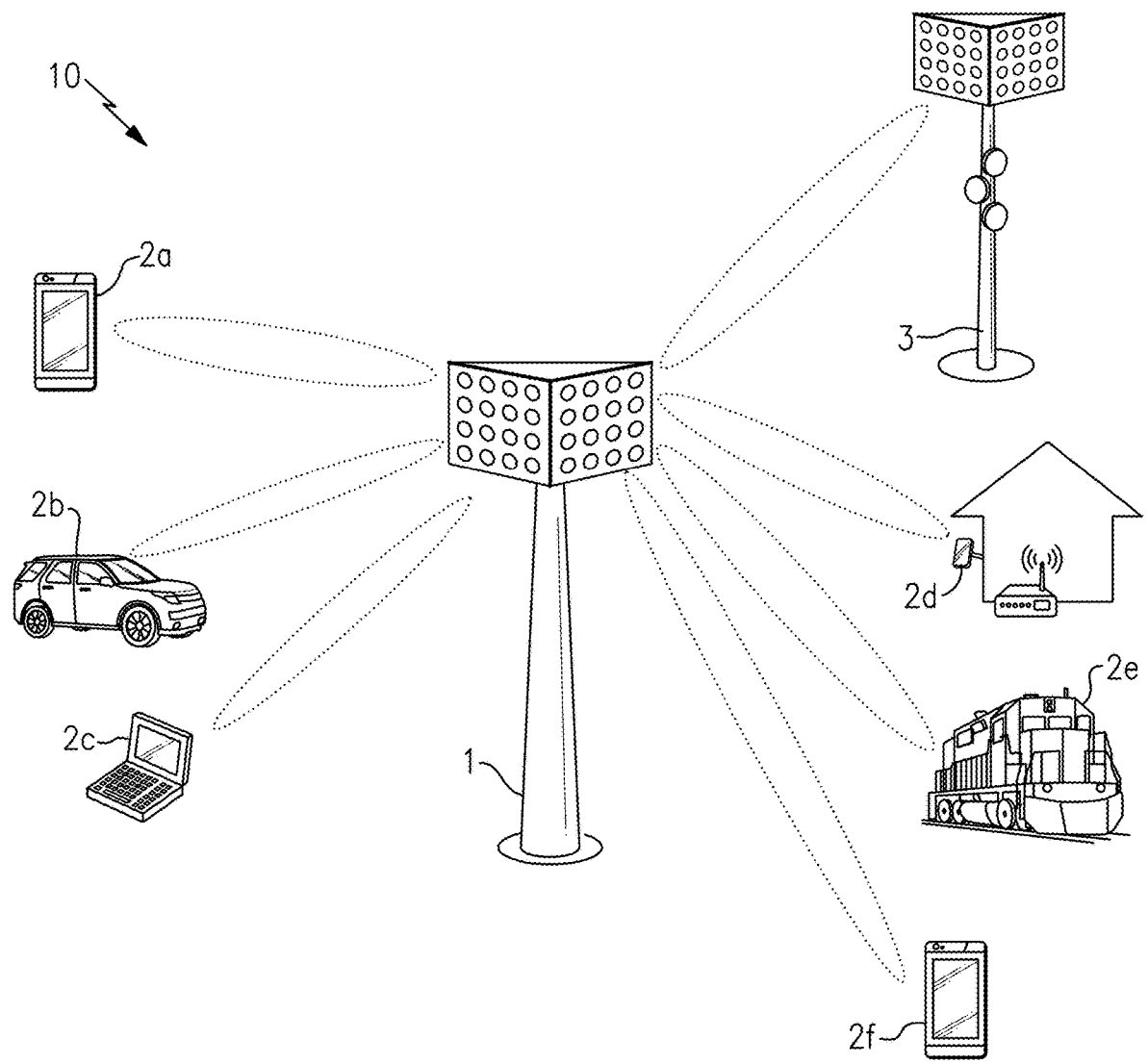
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet-of-Things (NB-IOT), Vehicle-to-Everything (V2X), and High Power User Equipment (HPUE).

3GPP plans to introduce Phase 1 of fifth generation (5G) technology in Release 15 (targeted for 2018) and Phase 2 of 5G technology in Release 16 (targeted for 2019). Release 15 is anticipated to address 5G communications at less than 6 GHz, while Release 16 is anticipated to address communications at 6 GHz and higher. Subsequent 3GPP releases will further evolve and expand 5G technology. 5G technology is also referred to herein as 5G New Radio (NR).

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, and a second mobile device 2f.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices.

The illustrated communication network 10 of FIG. 1 supports communications using a variety of technologies, including, for example, 4G LTE, 5G NR, and wireless local area network (WLAN), such as Wi-Fi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communication with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 ms. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

In the scope of 5G NR specification development, uplink channel bandwidth of up to about 400 MHz are being considered, which is significantly larger than 20 MHz uplink channel bandwidth associated with LTE.

Overview of Dynamic Waveform Control and Power Boost

Radio frequency (RF) communication systems with dynamic waveform control and power boost are provided herein. In certain embodiments, an RF communication system includes a power amplifier that amplifies an RF signal to generate an RF transmit signal for transmission over a time-division duplex (TDD) communication link having a duty cycle, and a transmitter that provides the RF signal to the power amplifier. The transmitter is operable to change a type of waveform of the RF signal from a first waveform type to a second waveform type in response to a decrease in a signal-to-noise ratio (SNR) of the TDD communication link, and to boost a power of the RF transmit signal by an amount based on the duty cycle.

Accordingly, in response to a decrease in SNR of the TDD communication link, a type of waveform for transmission is changed and the transmit power is increased by an amount that depends on the duty cycle of the TDD communication link. By implementing the RF communication system in this manner, wireless signaling at greater distances and/or in harsher radio environments can be achieved. For example, performance of UE operating at a cell edge can be enhanced, such as increased uplink bandwidth.

In certain implementations, the TDD communication link includes several available transmit frames, and the transmitter further selects the amount of power boost based on a number of utilized transmit frames in which the RF transmit signal is transmitted. Thus, the power boost can be selected based on the number of utilized transmit frames. Furthermore, in certain implementations the transmitter decreases the number of utilized transmit frames and further increases the amount of power boost.

The amount of power boost can also be based on other considerations, such as emissions regulations. In one example, the selected amount of power boost is also based on a specific absorption rate (SAR) value or limit.

In response to the decrease in SNR of the TDD communication link, the transmitter can change the waveform type to lower peak to average power ratio (PAPR) and/or to reduce modulation complexity. For instance, in one example, the waveform type is changed from modulation with quadrature phase shift keying to modulation with binary phase shift keying. In another example, the waveform type is changed from a first waveform type with cyclic prefix coding (for instance, CP-OFDM) to a second waveform type with discrete Fourier transformation spreading (for instance, DFT-s-OFDM).

In certain implementations, the RF communication system is implemented in UE (for instance, in a mobile device, tablet, or other UE), and the RF communication system receives a base station control signal from a base station. In certain embodiments, the base station instructs the UE to change the waveform type and/or to change the power boost based on the base station detecting a decrease in SNR of the TDD communication link. For instance, the base station can process a receive strength signal indication (RSSI) and/or other indication of SNR of the TDD communication link to thereby detect the decrease.

Accordingly, in certain implementations, a base station directs or instructs a mobile device to change waveform type and to provide a duty cycle dependent power boost in response to the base station detecting a decrease in SNR.

Figure 2:
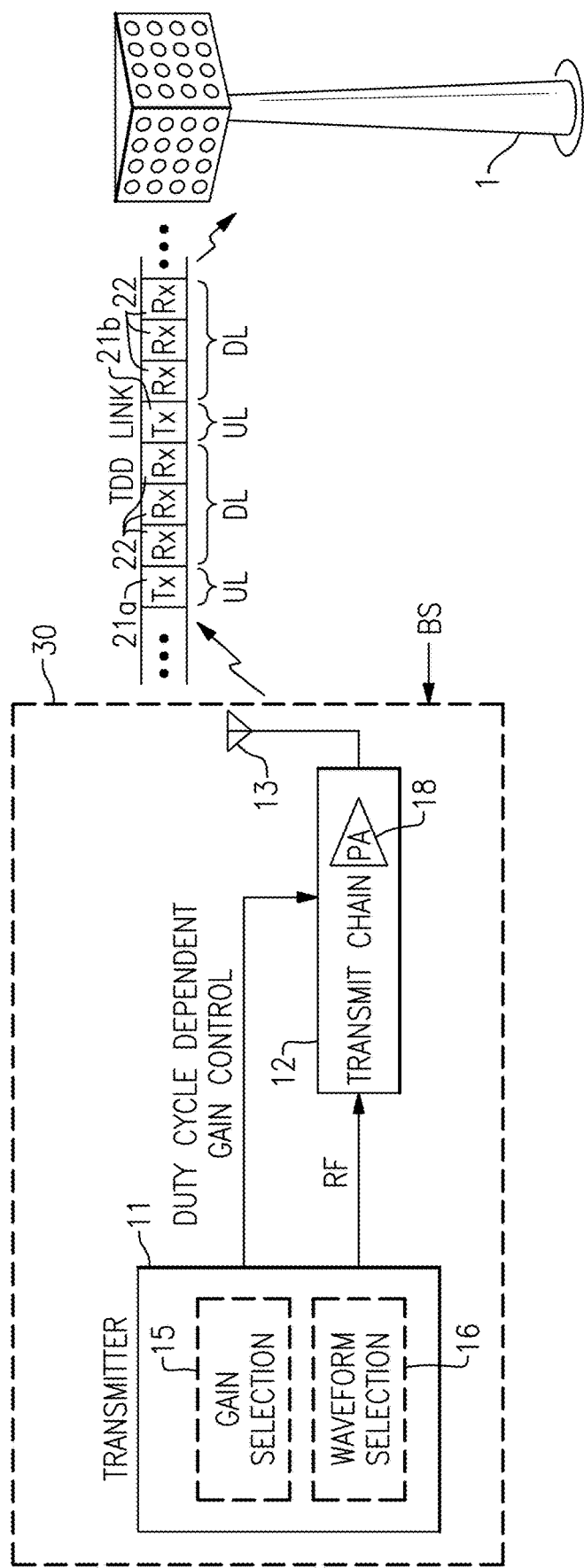
FIG. 2 is a schematic diagram of one embodiment of an RF communication system with dynamic waveform control and power boost.

FIG. 2 is a schematic diagram of one embodiment of an RF communication system 30 with dynamic waveform control and power boost. The RF communication system 30 corresponds to UE in this embodiment, and is in communication with the base station 1 at least over a TDD communication link. Although not shown in FIG. 2 for clarity of the figure, the RF communication system 30 can wirelessly communicate with the base station 1 over one or more other communication links, for instance, over one or more FDD communication links and/or over one or more additional TDD communication links.

The RF communication system 30 includes a transmitter 11, a transmit chain 12, and an antenna 13. The transmitter 11 includes a gain selection circuit 15, and a waveform selection circuit 16. Although various circuitry and components of the RF communication system 30 are shown, the RF communication system 30 can be implemented in other ways. Moreover, the RF communication system 30 can include additional circuitry and components that have been omitted from FIG. 2 for clarity. In one example, the RF communication system 30 further includes a receive chain and a receiver, which process signals received from the antenna 13 and/or another antenna.

The transmitter 11 generates an RF signal, which is provided to the transmit chain 12 for amplification and other signal conditioning. The transmit chain 12 includes at least a power amplifier 18, which provides an RF transmit signal to the antenna 13 for wireless transmission over the TDD communication link.

As shown in FIG. 2, the TDD communication link includes transmit (Tx) and receive (Rx) time slots, such as Tx time slots 21a-21b and Rx time slots 22. The Tx time slots 21a-21b corresponding to uplink (UL) communications in which the RF communication system 30 is permitted to transmit to the base station 1 over the TDD communication link. Additionally, the Rx time slots 22 corresponding to downlink (DL) communications in which the RF communication system 30 is permitted to receive transmissions from the base station 1 over the TDD communication link. In certain implementations, the timing of when the time slots occur is controlled at the network level.

The TDD communication link has a duty cycle corresponding to a fraction of the time slots dedicated to UL communications. For instance, in this example, the duty cycle is about 25% corresponding to about one-quarter of the time slots dedicated to UL communications. Although an example with a 25% duty cycle is shown, the duty cycle of a TDD communication link can have a variety of different values and can change over time with network usage, radio environment, and/or a variety of other factors. In certain implementations, the TDD communication link corresponds to wireless communications over at least one 3GPP frequency band, such as a 5G NR band.

In the illustrated embodiment, the transmitter 11 includes the gain selection circuit 15, which controls a gain of the RF transmit signal. The gain selection circuit 15 can control gain in a wide variety of ways, including, but not limited to, providing gain adjustment to one or more components of the transmit chain 12. The transmitter 11 further includes the waveform selection circuit 16, which controls selection of the type of waveform of the RF signal.

The transmitter 11 operates to change a type of waveform of the RF signal from a first waveform type to a second waveform type in response to a decrease in SNR of the TDD communication link, and to boost a power of the RF transmit signal by an amount based on the duty cycle.

Thus, in response to the decrease in SNR of the TDD communication link, the gain selection circuit 15 provides a boost in power to the RF transmit signal, where an amount of the boost changes based on the duty cycle of the TDD communication link.

Furthermore, the waveform selection circuit 16 changes the type of waveform of the RF signal in response to the decrease in SNR of the TDD communication link. In certain implementations, the second waveform type has lower PAPR ratio than the first waveform type. In some implementations, the second waveform type includes discrete Fourier transformation spreading and the first waveform type includes a cyclic prefix coding. For instance, in one example the first waveform type is a CP-OFDM waveform and the second waveform type is a DFT-s-OFDM waveform. In various implementations, the first waveform type is modulated with quadrature phase shift keying and the second waveform type is modulated with binary phase shift keying.

As shown in FIG. 2, the TDD communication link includes a first Tx time slot 21a in which the communication network permits the RF communication system 30 to transmit to the base station 1 over the link, and a second Tx time slot 21b in which the communication network permits the RF communication system 30 to transmit to the base station 1 over the link. In certain implementations, the gain selection circuit 15 further selects the amount of power boost based on a number of utilized transmit frames in which the RF transmit signal is transmitted. Thus, the power boost can be controlled based on the number of utilized transmit frames relative to the number of available transmit frames. Furthermore, in some implementations the transmitter 11 decreases the number of utilized transmit frames and the gain selection circuit 15 further increases the amount of power boost from a first boosted power level to a second boosted power level.

Thus, transmission can occur over fewer Tx time slots (for instance, over the first Tx time slot 21a but not the second Tx time slot 21b, or vice versa) and the amount of power boost can be further increased. Implementing the RF communication system 30 in this manner provides enhanced performance at cell edge and/or other low-SNR conditions, while reducing average transmit power over time to maintain the RF communication system 30 within SAR limits.

In certain embodiments, the RF communication system 30 receives a base station control signal (BS) from the base station 1, and the base station control signal instructs the gain selection circuit 15 and/or waveform selection circuit 16 to control selection. Thus, in some embodiments the base station 1 instructs the RF communication system 30 to change the waveform type and/or to change the power boost based on the base station 1 detecting a decrease in SNR of the TDD communication link.

Figure 3:
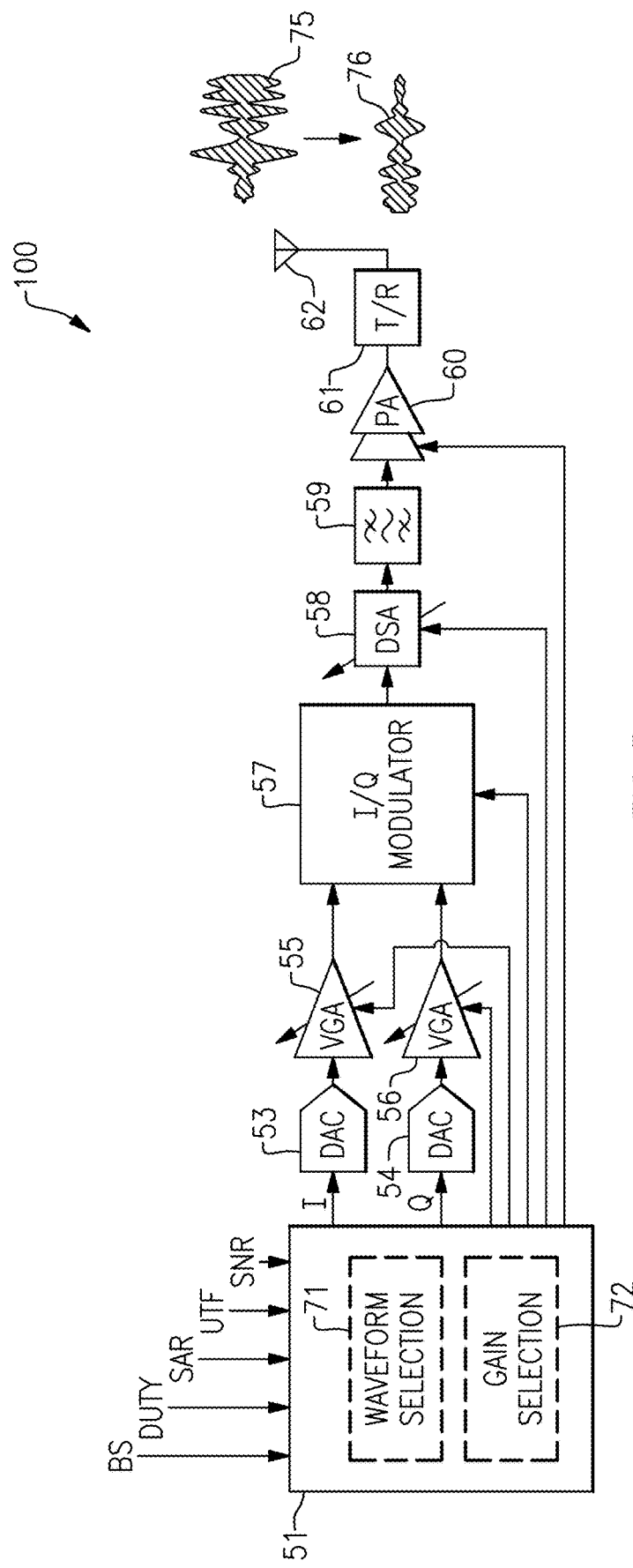
FIG. 3 is a schematic diagram on an RF communication system according to another embodiment.

FIG. 3 is a schematic diagram on an RF communication system 100 according to another embodiment. Although not shown in FIG. 3, the RF communication system 100 wirelessly communicates over a TDD communication link.

The RF communication system 100 includes a signal processor 51, an I-path digital-to analog converter (DAC) 53, a Q-path DAC 54, an I-path variable gain amplifier (VGA) 55, a Q-path VGA 56, an I/Q modulator 57, a digital step attenuator (DSA) 58, a bandpass filter 59, a power amplifier 60, a transmit/receive (T/R) switch 61, and an antenna 62. Although one example components of a transmit chain are shown, the teachings herein are applicable to transmit chains implemented in a wide variety of ways. For clarity of the figure, receive circuitry of the RF communication system 100 is not depicted.

In the illustrated embodiment, the signal processor 51 generates an in-phase (I) signal and a quadrature-phase (Q) signal, which digitally represent a desired RF signal of a particular type of waveform. The signal processor 51 includes a waveform selection circuit 71 for selecting the type of waveform. For example, the waveform selection circuit 71 can change the waveform from a first waveform type 75 to a second waveform type 76 with lower PAPR or crest factor in response to a decrease in SNR of the TDD communication link. In certain implementations, the signal processor 51 includes at least one of a baseband processor or a radio frequency integrated circuit (RFIC).

As shown in FIG. 3, the signal processor 51 further includes a gain selection circuit 72 for controlling a gain of the transmit path of the RF communication system 100. In this example, the gain selection circuit 72 controls gain by controlling an amount of gain provided by at least one of a controllable amplifier (for instance, VGAs 55, 56), a controllable attenuator (for instance, DSA 58), a gain of a modulator, or a bias and/or dimensioning of a PA. Although one example of gain control is shown, a gain selection circuit can control transmit power in a wide variety of ways.

The gain selection circuit 72 changes the selected gain to provide a power boost in response to a decrease in SNR of a TDD communication link. The amount of the power boost is duty cycle dependent, and thus changes with a duty cycle of the TDD communication link.

In the illustrated embodiment, the signal processor 51 receives a base station control signal (BS) from a base station that the RF communication system 100 is in wireless communication with. In certain implementations, the base station control signal directs the RF communication system 100 to select a particular waveform and/or amount of power boost.

Although an example where the signal processor 51 receives the base station control signal is shown, the signal processor 51 can additionally or alternatively receive one or more signals used for controlling selection. For example, in certain implementations, the signal processor 51 receives at least one of a duty cycle signal (DUTY) indicating a duty cycle of a TDD communication link, a specific absorption rate signal (SAR) indicating a SAR value or limit, a utilized transmit frame signal (UTF) indicating a number of transmit frames utilized by the RF communication system 100 relative to a number of available transmit frames in the TDD communication link, and/or a signal-to-noise ratio signal (SNR) indicating the SNR of the TDD communication link.

Figure 4A:
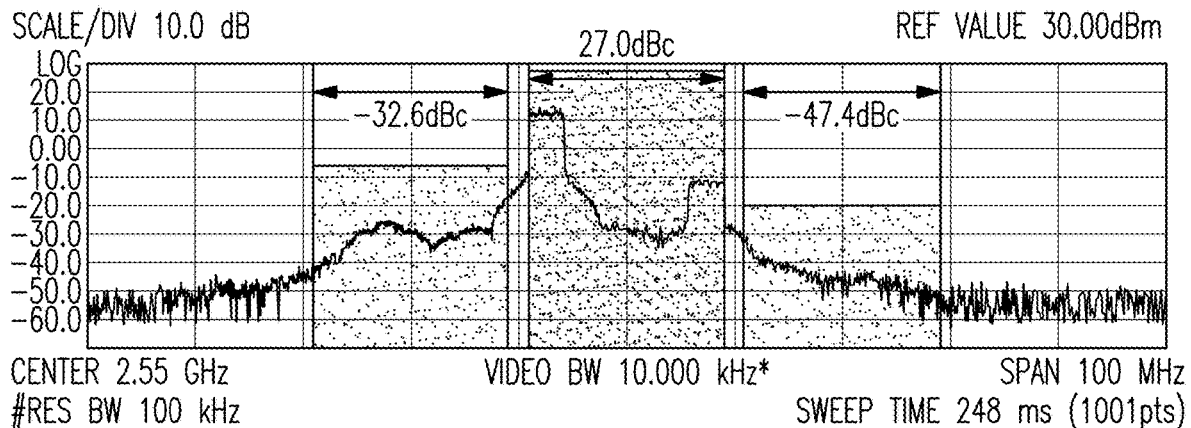
FIG. 4A is one example of measurements for a QPSK SC-FDMA waveform allocated with 18 RBs.

FIG. 4A is one example of measurements for a quadrature phase-shift keying (QPSK) single carrier frequency division multiple access (SC-FDMA) waveform allocated with 18 resource blocks (RBs).

Figure 4B:
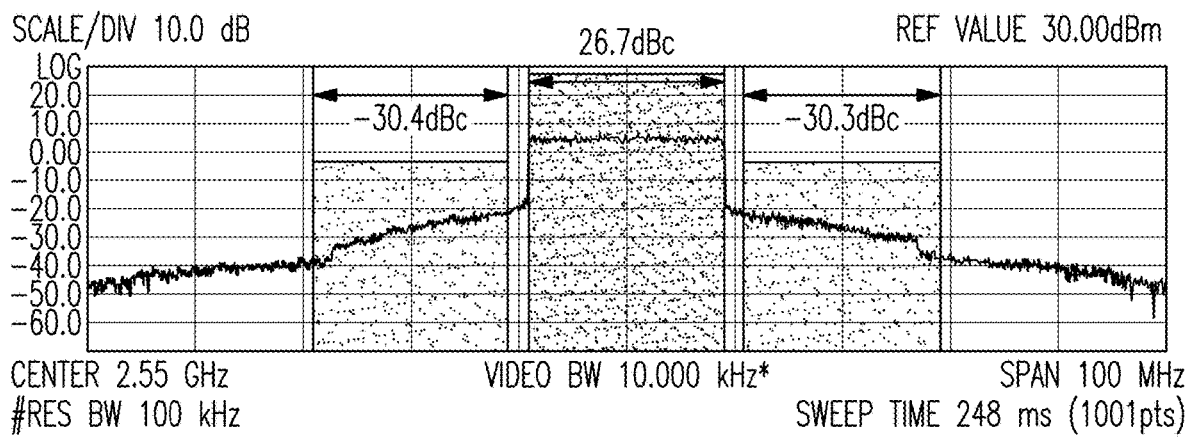
FIG. 4B is one example of measurements for a QPSK SC-FDMA waveform allocated with 100 RBs.

FIG. 4B is one example of measurements for a QPSK SC-FDMA waveform allocated with 100 RBs.

FIGS. 4A and 4B illustrated one example of suitable measurements for selecting a 0 dB maximum power reduction (MPR) position. For instance, a maximum output power is 27 dBm for 18 RBs as limited by UTRA1 adjacent channel leakage ratio (ACLR) specifications from Universal Terrestrial Radio Access (UTRA), and a maximum output power is 26.7 dBm as limited by Evolved Universal Terrestrial Radio Access (EUTRA) ACLR. After correcting for 0.3 dB evaluation board losses, a 1 dB MPR power amplifier output power is about 27 dBm, in this example.

Although one example of measurements for evaluation of MPR is provided, other measurements and/or MPR values possible.

For a given power class, a power amplifier can be dimensioned based on the waveform used to set a 0 dB MPR condition. For example, a peak to average power ratio (PAPR) parameter at a defined linearity level (for instance, ACLR or error vector magnitude (EVM) related) dictates an amount of back-off from saturation.

Figure 5A:
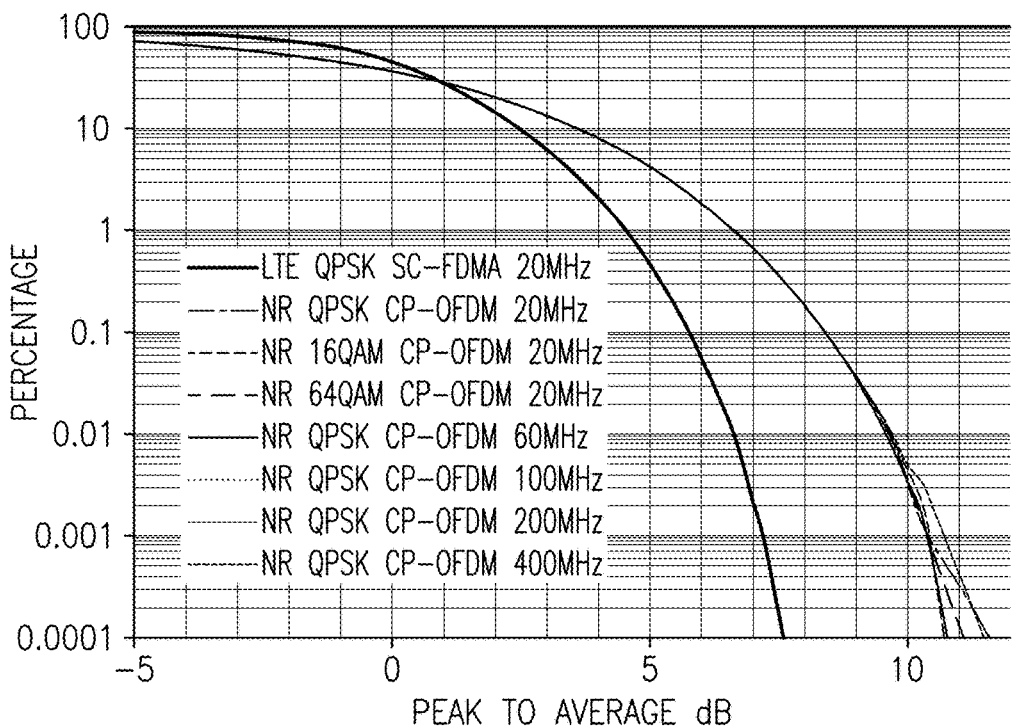
FIG. 5A is one example of a PAPR CCDF for various CP-OFDM waveforms relative to a SC-FDMA reference waveform.

FIG. 5A is one example of a PAPR complementary cumulative distribution function (CCDF) for various cyclic prefix orthogonal frequency division multiplexing (CP-OFDM) waveforms relative to a SC-FDMA reference waveform. As shown in FIG. 5A, the PAPR CCDF is shown for a variety of modulation orders and bandwidths of CP-OFDM 5G NR waveforms. For the example waveforms shown, higher order modulations and wider signal bandwidth does not substantially increase PAPR, but rather the CP-OFDM waveforms have similar PAPR to one another.

When comparing 5G NR CP-OFDM waveforms to the reference LTE SC-FDMA QPSK waveform it can be seen that the 5G NR waveforms exhibit higher PAPR of about 3 dB or more. The higher PAPR results in higher linearity specification for a power amplifier, which in turn results in further back-off levels.

Moreover, higher PAPR has a consequence in worst-case link conditions. For example, for UE operating at a cell edge, the UE can operate with either 3 dB lower output power or with more than doubled battery current.

Figure 5B:
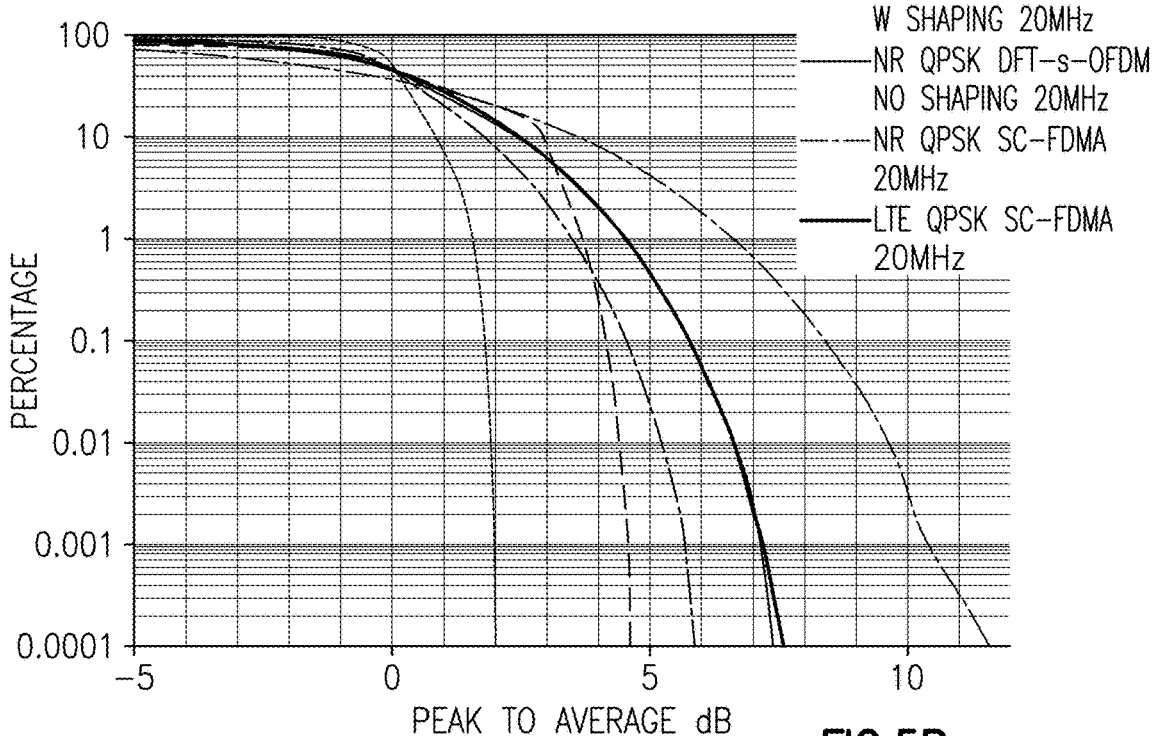
FIG. 5B is one example of a PAPR CCDF for various DFT-s-OFDM waveforms relative to a SC-FDMA reference waveform and a QPSK CP-OFDM 20 MHz waveform.

FIG. 5B is one example of a PAPR CCDF for various discrete Fourier transformation-spread-orthogonal frequency division multiplexing (DFT-s-OFDM) waveforms relative to a SC-FDMA reference waveform and a QPSK CP-OFDM 20 MHz waveform. As shown in FIG. 5B, the PAPR CCDF is shown for a variety of modulation order and bandwidths of CP-OFDM 5G NR waveforms, with or without spectral shaping. The QPSK DFT-s-OFDM 20 MHz waveform without shaping has similar PAPR behavior as the reference LTE SC-FDMA QPSK waveform.

As shown by a comparison of FIGS. 5A and 5B, the DFT-s-OFDM waveforms of FIG. 5B operate with lower PAPR relative to the CP-OFDM waveforms of FIG. 5A.

DFT-s-OFDM waveforms operate with lower PAPR, and thus impact cell range and achievable uplink data rates at a cell edge. Since an achievable downlink data rate can also be constrained by an uplink data rate (for instance, due to overhead), a waveform's PAPR can also affect achievable downlink data rates at cell edge. For instance, in certain networks, uplink data rate must stay within about 5% of downlink data rate to support control, acknowledgement, and other overhead associated with the communication link. Accordingly, higher downlink data rates can be achieved by increasing uplink data rate.

The DFT-s-OFDM waveforms offer reduced PAPR. In certain implementations PI/2 BPSK and/or spectral shaping techniques can also be used to reduce PAPR. For instance, for the examples shown, spectral shaping techniques selectively enable 2 dB PAPR improvement for QPSK and 5 dB improvement for PI/2 BPSK DFT-s-OFDM waveforms when compared to the reference LTE signal.

Figure 6A:
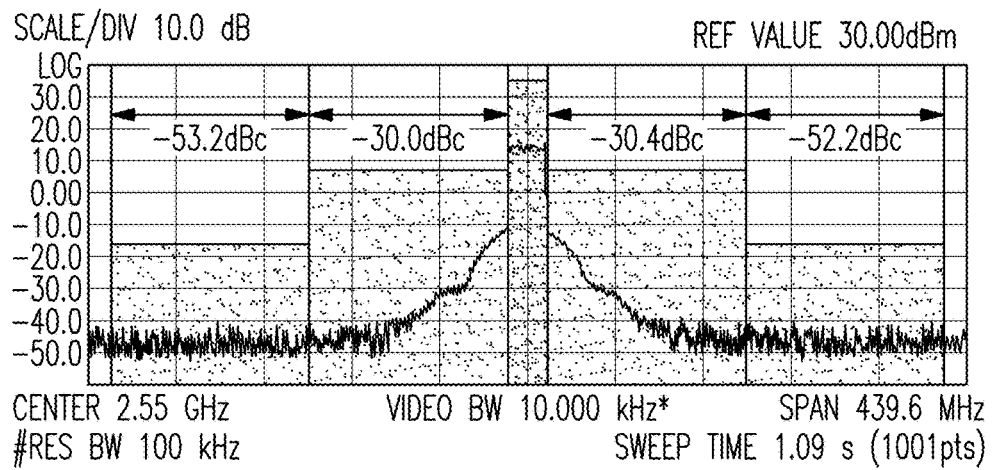
FIG. 6A is one example of measured output power capability with ACLR back-off for a QPSK CP-OFDM 105RB/15 kHz 20 MHz waveform.

FIG. 6A is one example of measured output power capability with ACLR back-off for a QPSK CP-OFDM 105RB/15 kHz 20 MHz waveform.

Figure 6B:
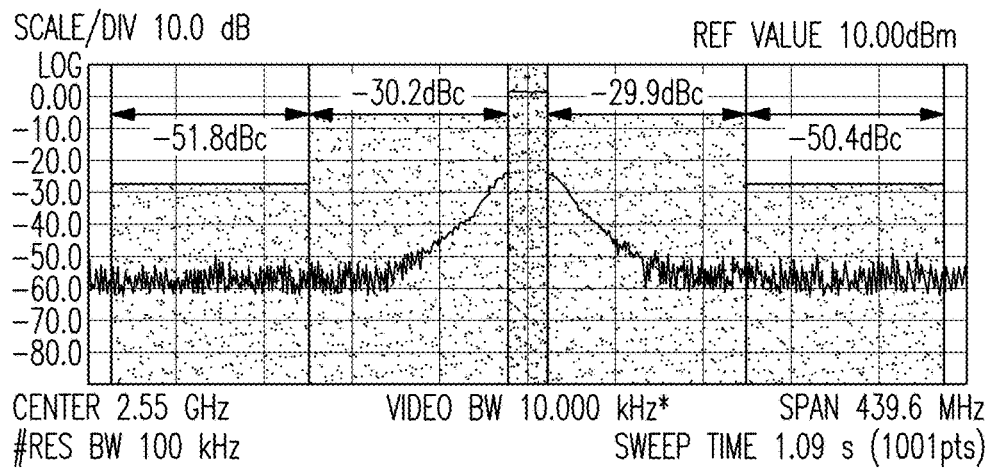
FIG. 6B is one example of measured output power capability with ACLR back-off for a 64QAM CP-OFDM 105RB/15 kHz 20 MHz waveform.

FIG. 6B is one example of measured output power capability with ACLR back-off for a 64QAM CP-OFDM 105RB/15 kHz 20 MHz waveform.

Figure 6C:
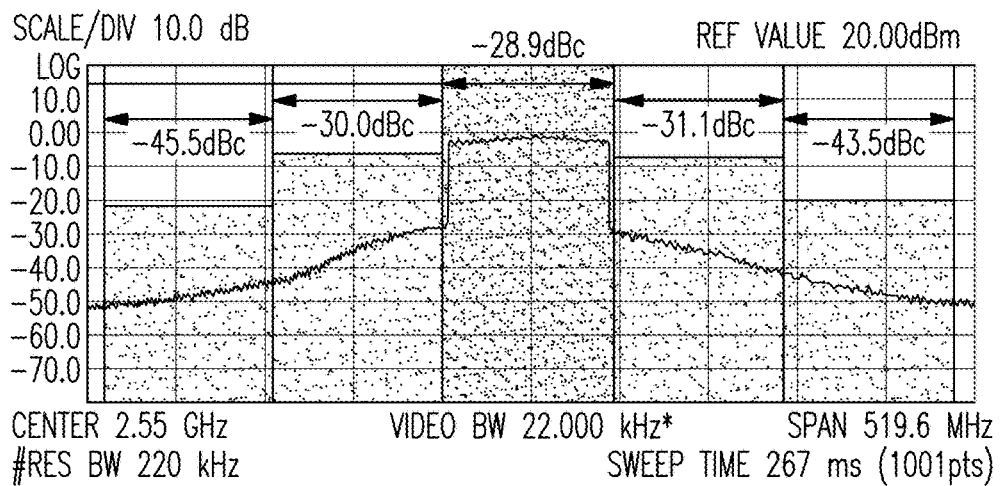
FIG. 6C is one example of measured output power capability with ACLR back-off for a QPSK CP-OFDM 263RB/30 kHz 100 MHz waveform.

FIG. 6C is one example of measured output power capability with ACLR back-off for a QPSK CP-OFDM 263RB/30 kHz 100 MHz waveform.

Figure 7A:
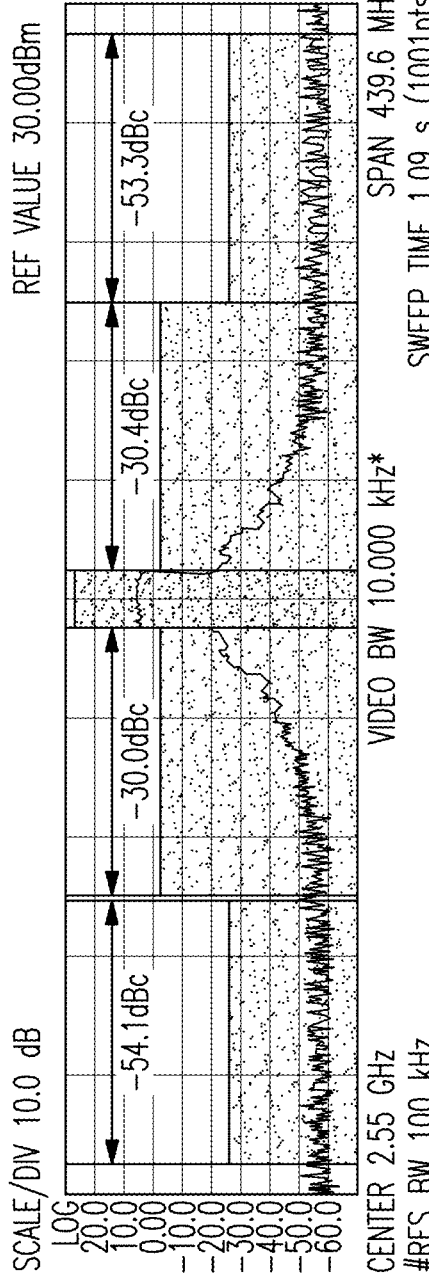
FIG. 7A is one example of measured output power capability with ACLR back-off for an unfiltered PI/2 BPSK DFT-s-OFDM 100RB 20 MHz waveform.

FIG. 7A is one example of measured output power capability with ACLR back-off for an unfiltered PI/2 BPSK DFT-s-OFDM 100RB 20 MHz waveform.

Figure 7B:
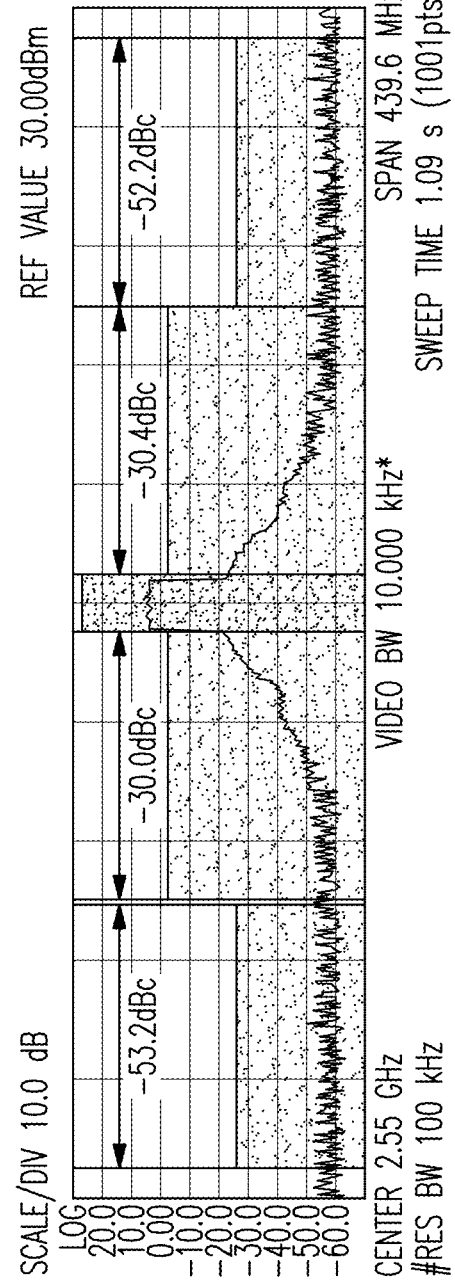
FIG. 7B is one example of measured output power capability with ACLR back-off for an unfiltered QPSK DFT-s-OFDM 100RB 20 MHz waveform.

FIG. 7B is one example of measured output power capability with ACLR back-off for an unfiltered QPSK DFT-s-OFDM 100RB 20 MHz waveform.

Figure 7C:
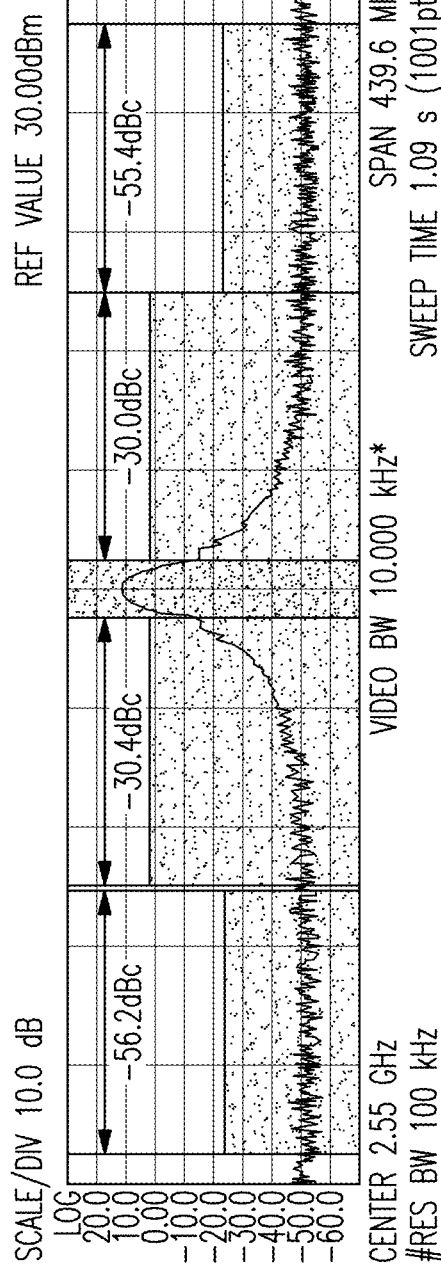
FIG. 7C is one example of measured output power capability with ACLR back-off for a filtered PI/2 BPSK DFT-s-OFDM 100RB 20 MHz waveform.

FIG. 7C is one example of measured output power capability with ACLR back-off for a filtered PI/2 BPSK DFT-s-OFDM 100RB 20 MHz waveform.

Figure 7D:
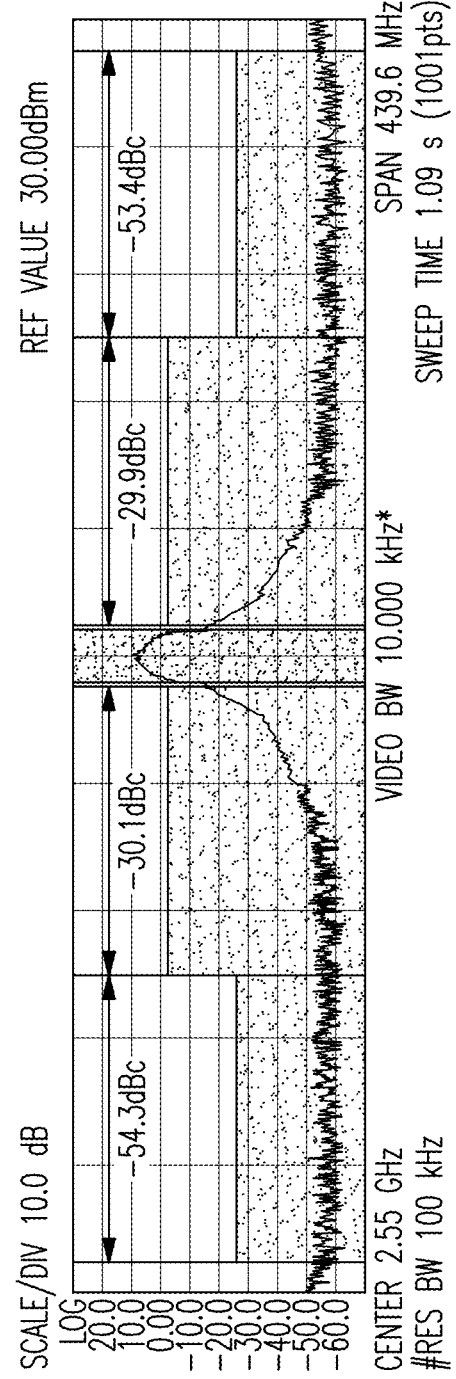
FIG. 7D is one example of measured output power capability with ACLR back-off for a filtered QPSK DFT-s-OFDM 100RB 20 MHz waveform.

FIG. 7D is one example of measured output power capability with ACLR back-off for a filtered QPSK DFT-s-OFDM 100RB 20 MHz waveform.

With reference to FIGS. 6A-7D, the output power capability of a power amplifier is shown using a −30 dBc ACLR criteria. Table 1 below summarizes power amplifier output power, back-off, MPR, boost, and ACLR limiting output power for various waveforms.

TABLE 1

| Waveforms | | | ACLR | | Pout | back-off | MPR | Boost |
|---|---|---|---|---|---|---|---|---|
| Type | Mod | BW-RB/SCS | limit | dBc | dBm | dB | dB | dB |
| LTE SC-FDMA | QPSK | 20 MHz-18/15 kHz | UTRA1 | −33.2 | 27.3 | 0.0 | 0 | |
| | QPSK | 20 MHz-100/15 kHz | EUTRA | −30.3 | 27.0 | 0.3 | 1 | |
| NR CP-OFDM | QPSK | 20 MHz-105/15 kHz | EUTRA | −30.1 | 24.3 | 3.0 | 3.5 | |
| | 64QAM | 20 MHz-105/15 kHz | EUTRA | −30.3 | 24.1 | 3.2 | 3.5 | |
| | QPSK | 100 MHz-263/30 kHz | 100 MHz | −30.1 | 24.2 | 3.1 | 3.5 | |
| NR unfiltered DFT-s-OFDM | Pi/2 BPSK | 20 MHz-100/15 kHz | EUTRA | −30.2 | 27.7 | −0.4 | | 1 |
| | QPSK | 20 MHz-100/15 kHz | EUTRA | −30.2 | 26.6 | 0.7 | 1 | |
| NR filtered DFT-s-OFDM | Pi/2 BPSK | 20 MHz-100/15 kHz | EUTRA | −30.0 | 30.0 | −2.7 | | 3 |
| | QPSK | 20 MHz-100/15 kHz | EUTRA | −30.0 | 28.0 | −0.7 | | 1 |
| | Pi/2 BPSK | 20 MHz-18/15 kHz | EUTRA | −32.3 | 30.0 | −2.7 | | 3 |
| | QPSK | 20 MHz-18/15 kHz | EUTRA | −30.2 | 29.3 | −2.0 | | 2 |

As shown in Table 1, MPR and power boost values are shown using the LTE 0 dB MPR reference, which is the 18RB QPSK SC-FDMA waveform.

Using this reference to define a 5G NR 23 dBm power class for sub-6 GHz operation, the CP-OFDM waveforms would need up to 3.5 dB MPR. Accordingly, using a legacy LTE 0 dB MPR definition for 23 dBm 5G NR power class the CP-OFDM waveforms would require more than 3 dB MPR.

However, when using this reference, the CP-OFDM waveforms would need up to 3.5 dB MPR and thus transmit at less than 20 dBm, which significantly reduces their usability 80% of the cell range.

Table 2 shows various data related to sub-5 GHz 5G NR power class in terms of 0 dB MPR waveform. Certain data is referred to in terms of power class 2 (PC2) and power class 3 (PC3) as specified by the 3GPP. In the x-axis is output power and the applicable ACLR and SAR related limitations by regulation or uplink duty cycle. Additionally, for different waveform scenarios, the relative size of the power amplifier versus LTE PC3 or PC3 PA are then provided horizontally, showing up to which output power each waveform, bandwidth/RB allocation and modulation order is usable.

TABLE 2

| | Pout [dBm] | 18 | 19 | 20 | 21 | 22 | 23 | 24 | 25 | 26 | 27 | 28 | 29 |
|---|---|---|---|---|---|---|---|---|---|---|---|---|---|
| | ACLR | | | −30 dBc | | | | | −31 dBc | | | −32 dBc | |
| | Max DC [%] | | | 100 or Japan SAR limit | | | | <79 | <63 | <50 | <40 | <30 | <25 |
| 20 MHz LTE PC3 PA | BW [MHz] | | | | 20 | | | | | PCmax limit | | | |
| | RB | | | | 100 | | | 18 | | | | | |
| | Mod | 256 QAM | 64 QAM | 16 QAM | | QPSK | | | | | | | |
| | Waveform | | | | SC-FDMA | | | | | | | | |
| 20 MHz LTE PC2 PA | BW [MHz] | | | | | 20 | | | | | PCmax limit | | |
| | RB | | | | | 100 | | | | 18 | | | |
| | Mod | | | 256 QAM | | | | 64 QAM | 16 QAM | QPSK | | | |
| | Waveform | | | | | SC-FDMA | | | | | | | |

| NR MPR/ Power Boost | | MPR [dB] −30 dBc ACLR | | | | | | Power Boost [dB] −31 dBc | | | | | |
|---|---|---|---|---|---|---|---|---|---|---|---|---|---|
| | | 5 | 4 | 3 | 2 | 1 | 0 | 1 | 2 | 3 | 4 | 5 | 6 |
| NR1 with LTE PC3 PA | BW [MHz] | 20-100 | | | | | 20 | | | | ACLR limit | | |
| | RB | 105-263 | | | | 100 | | 18 | 100 | | | | |
| | Mod | QPSK/64 QAM | | | | QPSK | | | F PI/2 BPSK | | | | |
| | Waveform | CP-OFDM | | | | | | | DFT-s-OFDM | | | | |
| NR2 with 1.3x LTE PC3 PA | BW [MHz] | 20-100 | | | | | | 20 | | | ACLR limit | | |
| | RB | 105-263 | | | | | 100 | | 18 | | | | |
| | Mod | QPSK/64 QAM | | | | | QPSK | | F PI/2 BPSK | | | | |
| | Waveform | CP-OFDM | | | | | | | DFT-s-OFDM | | | | |
| NR3 with LTE PC2 PA | BW [MHz] | 20-100 | | | | | | | | 20 | | | ACLR limit |
| | RB | 105-263 | | | | | | | 100 | | 18 | 100 | 18 |
| | Mod | QPSK/64 QAM | | | | | | | QPSK | | F PI/2 BPSK | | |
| | Waveform | CP-OFDM | | | | | | | | DFT-s-OFDM | | | |

TABLE 2-continued

| Scen. | | | | | | |
|---|---|---|---|---|---|---|
| NR4 with 2x LTE PC2 PA | BW [MHz] | 20-100 | | 20 | | |
| | RB | 105-263 | 100 | 18 | 100 | 18 |
| | Mod | QPSK/64 QAM | QPSK | | F PI/2 BPSK | |
| | Waveform | CP-OFDM | DFT-s-OFDM | | | |

As shown in Table 2, the first two scenarios are the reference PC3 and PC2 for LTE. Then various 5G NR scenarios (NR1, NR2, NR3 and NR4) are displayed with possibilities for CP-OFDM, unfiltered QPSK DFT-s-OFDM and filtered PI/2 BPSK DFT-s-OFDM.

The table includes values of power boost where output power can >23 dBm for some waveforms provided some duty cycle limit is fulfilled for SAR.

The power added efficiency (PAE) of QPSK CP-OFDM waveforms can be about 20% lower than for QPSK DFT-s-OFDM and ACLR limited power is 3 dB lower with only 5% higher data rate.

Table 3 below provides various options for sub-6 GHz power class definition. As shown in Table 3, using DFT-s-OFDM waveforms for cell edge condition is important for providing a good compromise between system performance (throughput, cell coverage) and UE battery life and cost. Furthermore, using filtered PI/2 BPSK DFT-s-OFDM waveforms allows further power boost and would enable higher RB allocations than unfiltered QPSK.

system performance and similar UE battery life than LTE. Furthermore, the UE can selectively operate with filtered PI/2 BPSK DFT-s-OFDM QPSK waveforms for sub-6 GHz NR as an optional feature to enable further power boost for cell edge performance.

Furthermore, in certain configurations, power boost beyond 23 dBm can be provided to enable higher transmitted power provided that SAR limit is met via a maximum duty cycle. Implementing UE in this manner can allow defining a single power class and HPUE only being related to enabling power boost or not. Furthermore, higher granularity in output power depending on waveforms can be provided. When the UE operates in a country in which a 23 dBm power limit cannot be exceeded, power boost can be disabled.

Accordingly, power amplifier capability can vary based on different waveforms. Additionally, a selective waveform can provide a balance between system performance and UE battery life and cost.

Figure 8:
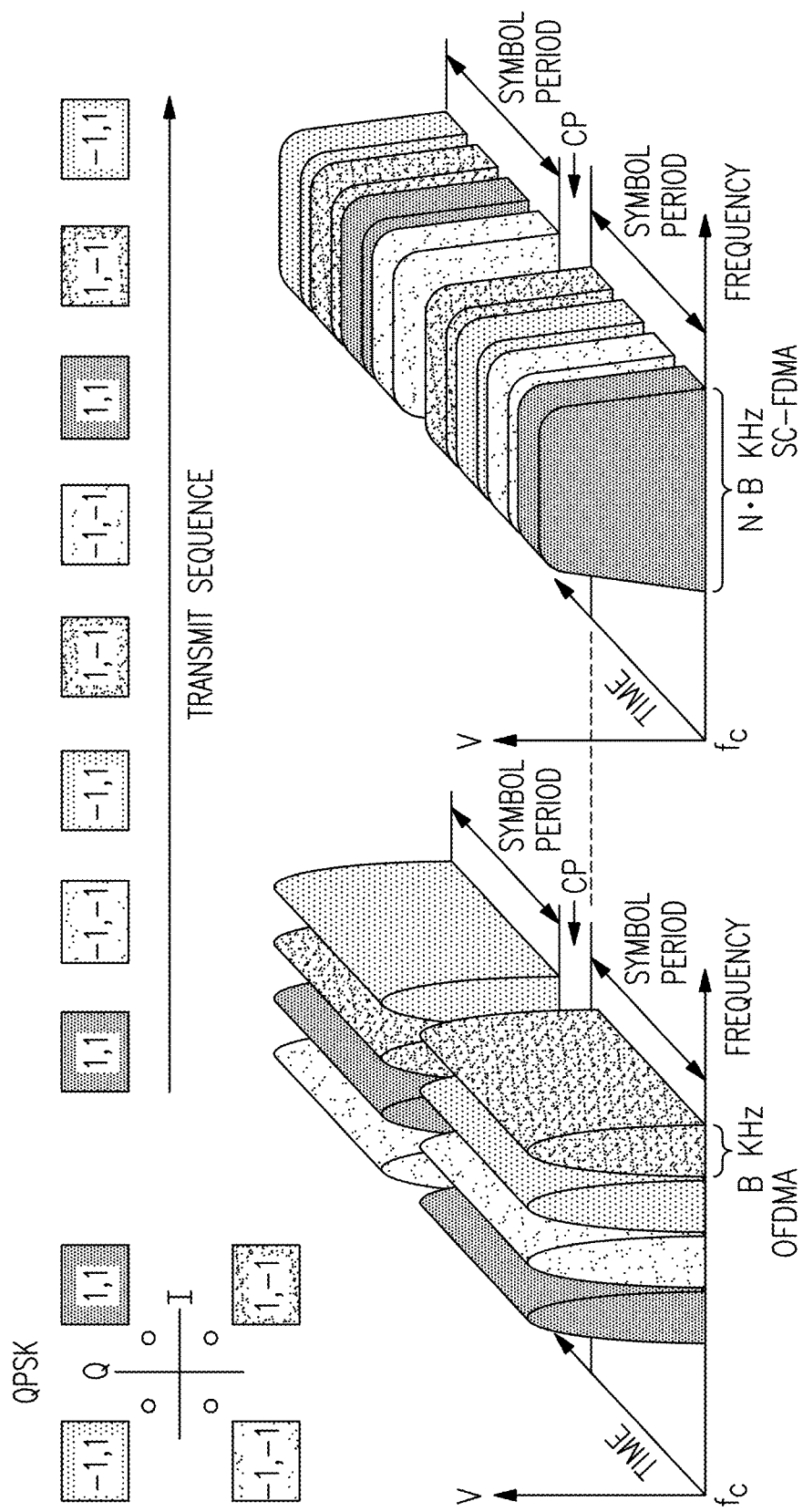
FIG. 8 is a schematic diagram illustrating two examples of multiple access schemes.

FIG. 8 is a schematic diagram illustrating two examples of multiple access schemes. The diagram includes an

TABLE 3

| Scen. | PA size vs LTE | Battery current impact | comment |
|---|---|---|---|
| NR1 | 1xPC3 | Same battery current than LTE PC3 at 23 dBm out, same in average for filtered PI/2 BPSK if power boost is applied | CP-OFDM waveforms can be used up to 20 dBm, reducing the applicable cell radius by 20% compared to LTE |
| NR2 | 1.3xPC3 | 130% of LTE PC3 at 23 dBm out, same in average for filtered PI/2 BPSK if power boost is applied | Fully allocated 20 MHz QPSK DFT-s-OFDM usable at 23 dBm. Power boost possibility with filtered PI/2 BPSK outside Japan provides good compromise between system performance and UE battery life for a PC3 definition |
| NR3 | 1xPC2 2xPC3 | 240% of LTE PC3 at 23 dBm out. Power boost average current is FFS | 20 MHz partial allocation QPSK or fully allocated f PI/2 BPSK DFT-s-OFDM usable at 26 dBm. CP-OFDM waveform usable up to 23 dBm. Power boost up to 28 dBm with feasible at low duty cycle provides flexible solution where power boost is only allowed outside Japan that covers both normal and HPUE with good compromise between system performance and UE battery life for a PC3 definition |
| NR4 | 2xPC2 4xPC3 | 240% of LTE PC2 at 25 dBm out. Power boost average current is FFS | Fully allocated 20 MHz QPSK DFT-s-OFDM usable at 26 dBm. CP-OFDM usable up to 25 dBm, 6 dB Power boost possibility with filtered PI/2 BPSK outside Japan. This provides limited system improvement since DFT-s-OFDM waveforms can be used at cell edge. |

Accordingly, low PAPR waveforms can be selectively used at cell edge. Since uplink data rate needs to be at least bout 5% of a downlink data rate to support overhead, low PAPR waveforms can be selectively used at a cell edge to provide both enhanced uplink and downlink performance.

In certain implementations, a UE selectively operates using unfiltered QPSK DFT-s-OFDM waveforms for challenging link situations, such as cell edge, for optimum example of frequency versus voltage versus time for OFDMA. The diagram further includes an example of frequency versus voltage versus time for SC-FDMA.

The examples are shown for an illustrated transmit sequence of different QPSK modulating data symbols, in this embodiment. As shown in FIG. 8, SC-FDMA includes data symbols occupying greater bandwidth (N*B KHz, where N=4 in this example) relative to OFDMA data symbols (B KHz). However, the SC-FDMA data symbols occupy the greater bandwidth for a fraction of time (1/N) relative to that of the OFDMA data symbols. FIG. 8 has also been annotated to show times of transmitting a cyclic prefix (CP).

Figure 9:
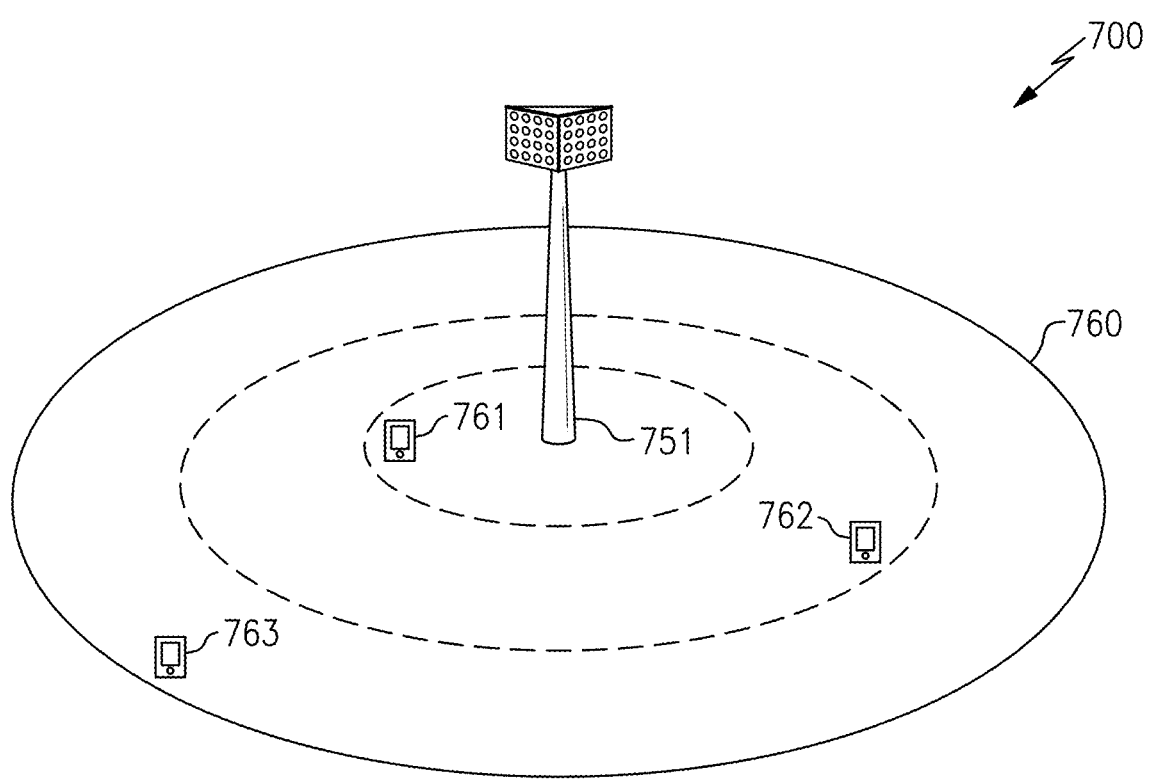
FIG. 9 is a schematic diagram of another example of a communication network.

FIG. 9 is a schematic diagram of another example of a communication network 700. The communication network 700 includes a base station 751 and various mobile devices 761-763. Although illustrated in the context of mobile devices, the teachings herein are applicable to any suitable type of user equipment. Accordingly, although one example of a communication network is shown, other configurations are possible, including, for example, communication networks with other numbers and/or types of user devices and/or base stations.

The base station 751 serves a land area or cell 760. Additionally, the mobile devices 761-763 are located in different locations of the cell 760 associated with different distances to the base station 751. The base station 751 communications with the mobile devices 761-763 at least in part using TDD communication links.

In the illustrated embodiment, the mobile devices 761-763 operate to dynamically control waveform and power boost based on position in the cell 760.

In a first example, a mobile device is operable to change the type of waveform from a first waveform type to a second waveform type of lower PAPR in response to a determination that the communication device is near an edge of the cell. The mobile device further provides an increase in transmit power that is based on a duty cycle of the TDD communication link in response to the determination. In certain implementations, the base station 751 determines the location of the mobile device within the cell, and thus makes the determination that the communication device is near cell edge.

In a second example, a mobile device is operable to change the type of waveform from a first waveform type without spectral shaping to a second waveform type with spectral shaping in response to a determination that the communication device is near an edge of the cell. The mobile device further provides an increase in transmit power that is based on a duty cycle of the TDD communication link in response to the determination.

In a third example, a mobile device is operable to change the type of waveform from a first waveform type with a cyclic prefix coding to a second waveform type with discrete Fourier transformation spreading in response to a determination that the communication device is near an edge of the cell. For instance, the first type of waveform can be a CP-OFDM waveform and the second type of waveform can be a DFT-s-OFDM waveform. The mobile device further provides an increase in transmit power that is based on a duty cycle of the TDD communication link in response to the determination.

In a fourth example, a mobile device is operable to change the type of waveform from a first waveform type with quadrature phase shift keying to a second waveform type with binary phase shift keying in response to a determination that the communication device is near an edge of the cell. The mobile device further provides an increase in transmit power that is based on a duty cycle of the TDD communication link in response to the determination.

Accordingly, as the mobile devices 761-763 move throughout the cell 760, waveforms and transmit power for uplink communications can be dynamically adapted or changed.

In certain embodiments herein, the UE (for instance, mobile devices 761-763) and/or base stations (for instance, base station 751) of a communication network are implemented to operate with multiple power classes within a fixed set of antenna resources. Additionally, the different power classes can be deployed in the UE or base station within a set array factor. In certain implementations, the power classes are associated with signals of at least 6 GHz, for example, 24 GHz or higher.

Figure 10A:
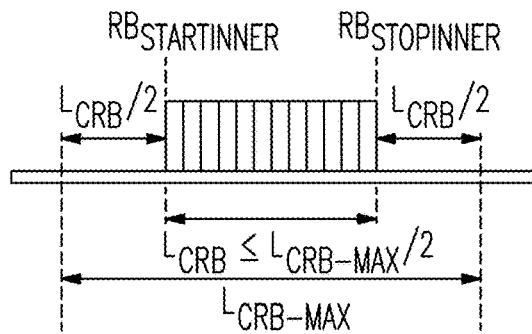
FIG. 10A is a schematic diagram of inner and outer RB allocations.

FIG. 10A is a schematic diagram of inner and outer RB allocations. In the illustrated diagram, 12 RBs have been allocated to an inner allocation of a frequency channel. In this example, inner allocations are up to half the maximum number of RB and at least half the RB length away from channel edge.

In FIG. 10A, $L_{CRB-MAX}$ is the maximum number of RB for a given channel bandwidth and sub-carrier spacing as specified by a communication standard, such as 5G NR. As shown in FIG. 10A, an outer allocation is within $L_{CRB}/2$ of each channel edge. Additionally an inner allocation (between $RB_{StartInner}$ and $RB_{StopInner}$) corresponds to the central frequency spectrum of the channel away from $L_{CRB}/2$ of each channel edge. In certain implementations, $RB_{StartInner} = L_{CRB}/2$ rounded down to next integer with floor at 1, and $RB_{StopInner} = L_{CRB-MAX} - RB_{StartInner} - L_{CRB}$. Thus, in some implementations in inner RB allocation are $L_{CRB}/2$ away from each edge of the maximum RB allocation for all $L_{CRB} \leq L_{CRB-MAX}/2$ rounded up to the next integer.

Table 4 below provides one example of MPR for PC2 and PC3 for outer versus inner RB allocations.

TABLE 4

| | MPR (dB) | |
|---|---|---|
| Modulation | Outer RB allocations | Inner RB allocations |
| DFT-s-OFDM PI/2 BPSK | ≤0.5 | 0 |
| DFT-s-OFDM QPSK | ≤1 | 0 |
| DFT-s-OFDM 16 QAM | ≤2 | ≤1 |
| DFT-s-OFDM 64 QAM | | ≤2.5 |
| DFT-s-OFDM 256 QAM | | ≤4.5 |
| CP-OFDM QPSK | ≤3 | ≤1.5 |
| CP-OFDM 16 QAM | ≤3 | ≤2 |
| CP-OFDM 64 QAM | | ≤3.5 |
| CP-OFDM 256 QAM | | ≤6.5 |

Table 5 below provides one example of PC2 and PC3 general MPR/UTRA A-MPR (PC3) values for various RB allocations. Some cases indicated as ≤0 dB MPR can operate with negative MPR (power boost).

TABLE 5

| PC2 and PC3 General MPR/UTRA A-MPR (PC3) | | | |
|---|---|---|---|
| RB Allocation Type | | Outer | Inner |
| RB allocation parameters | $L_{CRB}$ RB start | All $L_{CRB}/2$ from channel edge | $\leq L_{CRB-MAX}/2$ $\geq L_{CRB}/2$ from channel edge |
| DFT-s-OFDM | Pi/2 BPSK | ≤0.5/1.5 | ≤0/0 |
| | QPSK | ≤1/1 | ≤0/0 |
| | 16QAM | ≤2/0.5 | ≤1/0 |
| | 64QAM | ≤2.5/0.5 | ≤2.5/0 |
| | 256QAM | | ≤4.5/0 |
| CP-OFDM | QPSK | ≤3/1 | ≤1.5/0 |
| | 16QAM | ≤3/1 | ≤2/0 |
| | 64QAM | ≤3.5/0.5 | ≤3.5/0 |
| | 256QAM | | ≤6.5/0 |

Figure 10B:
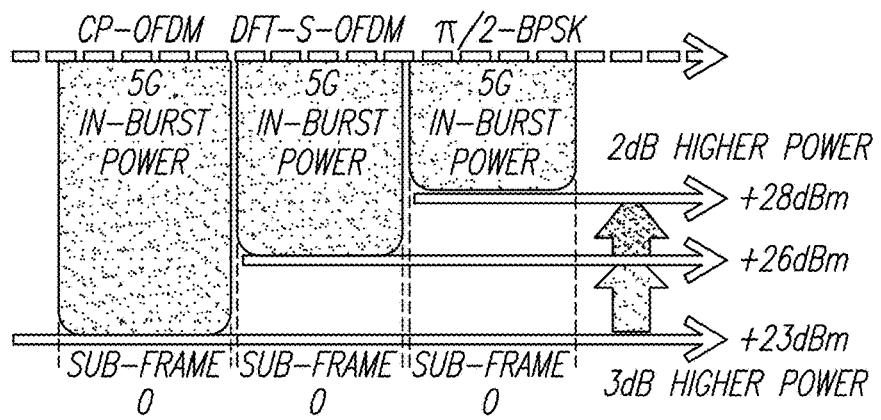
FIG. 10B illustrates a graph of boosted 5G in-burst power using lower PAPR waveforms.

FIG. 10B illustrates a graph of boosted 5G in-burst power using lower PAPR waveforms. Reduced PAPR waveform can transmit at higher power using the same power amplifier. In certain implementations, a transmit power limit (indicated by a dashed line at the top of the figure) is constrained by limits on out-of-band (OOB) emissions.

Figure 10C:
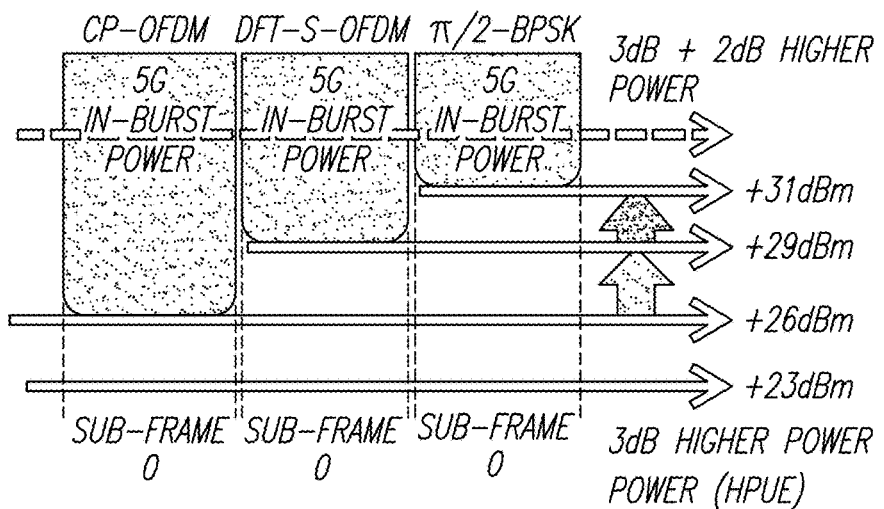
FIG. 10C illustrates a graph of boosted 5G in-burst power using partial allocation in channel center.

FIG. 10C illustrates a graph of boosted 5G in-burst power using partial allocation in channel center. For example, the graph can correspond to boosted 5G in-burst power when transmitting using inner RB allocations but not outer RB allocations as described above with respect to FIG. 10A. In certain implementations, a transmit power limit (indicated by a dashed line at the top of the figure) is constrained by limits on in-band emissions.

In certain implementations, allocations to a channel center can have relaxed ALCR, and thus boosting can be provided with consideration to error vector magnitude without needing to consider ALCR. Moreover, 3 dB clipping is possible. Thus, while outer RF allocations can be ACLR limited and have higher MPR, inner allocations can be EVM limited and lower MPR.

In certain embodiments herein, an RF communication system includes a power amplifier that amplifies an RF signal to generate an RF transmit signal for transmission over communication link, and a transmitter that provides the RF signal to the power amplifier. The transmitter is operable to control a resource block allocation of the RF signal to an inner resource block allocation in response to a decrease in a signal-to-noise ratio (SNR) of the communication link, and to boost a power of the RF transmit signal.

Accordingly, dynamic power boost can be provided in a number of cases, including, but not limited to: (1) based on duty cycle: for example, for duty cycles of 25% a 3 dB power boost would still keep the UE within SAR limits; (2) based on resource block allocation: for example, constraining a resource block allocation to an inner allocation that omits one or more outer resource blocks of a lower channel edge and one or more outer resource blocks of an upper channel edge; (3) emergency calls (for instance, UE can use inner allocation and transmit higher power for further reach; and/or (4) UE without SAR limitations that could deliver more power but reuse hardware dimensioned for mobile phones provided they use inner allocation waveforms with power boost capability, for instance, vehicles, CPEs, and safety radios, thereby enabling markets utilizing higher power transmitters to leverage the volumes of phone hardware.

In certain implementations herein, inner allocation of RBs permits power boost for a particular waveform without need any change in dimensioning of a power amplifier.

FIGS. 11A-13 illustrate various examples of RF electronics that can be implemented to include one or more features of the present disclosure. Although examples of RF electronics that can be implemented with dynamic wave control and power boost are shown, the teachings herein are applicable to RF electronics implemented in a wide variety of ways.

Figure 11A:
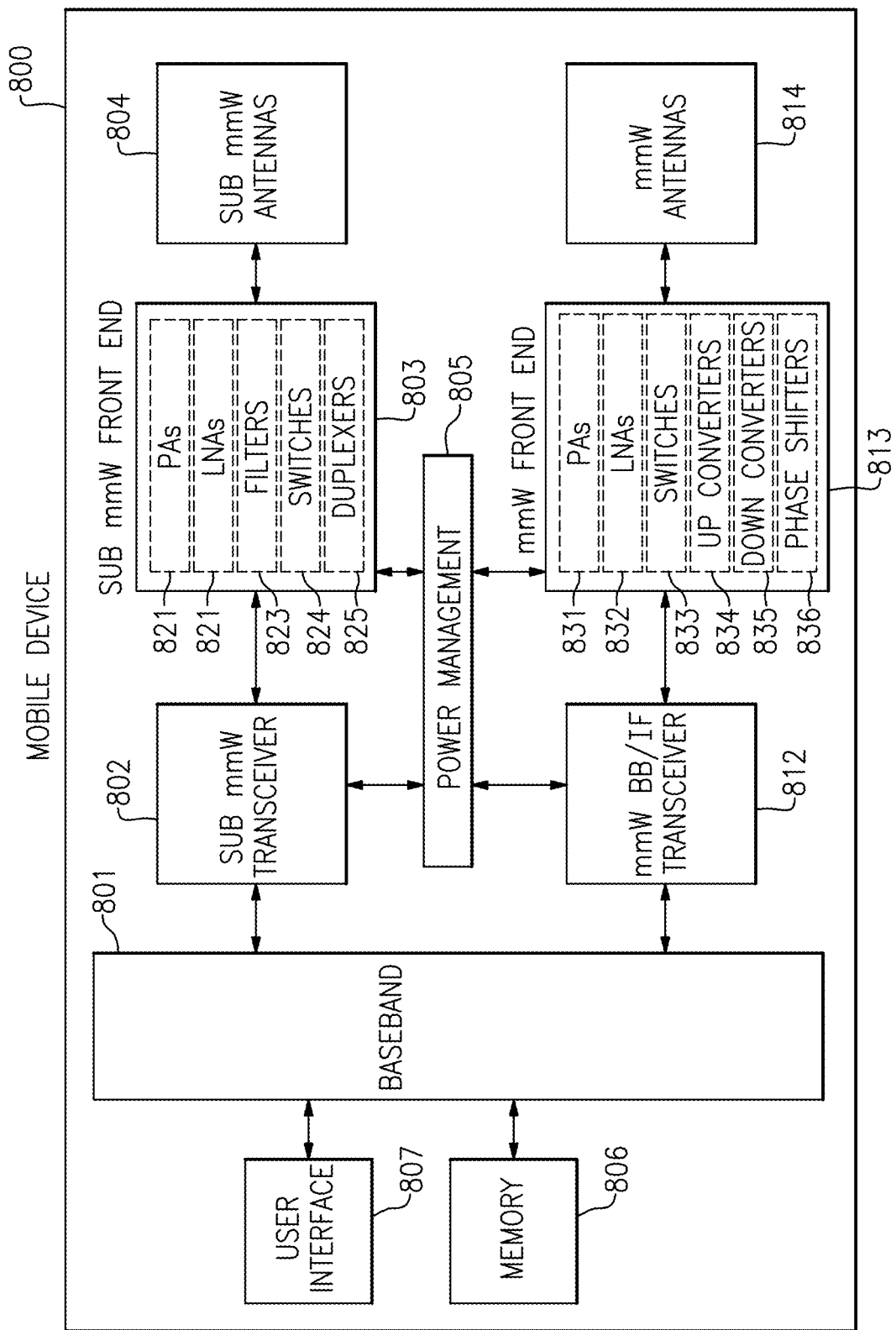
FIG. 11A is a schematic diagram of one embodiment of a mobile device.

FIG. 11A is a schematic diagram of one embodiment of a mobile device 800. The mobile device 800 includes a baseband system 801, a sub millimeter wave (mmW) transceiver 802, a sub mmW front end 803, sub mmW antennas 804, a power management system 805, a memory 806, a user interface 807, a battery 808, a mmW baseband (BB)/intermediate frequency (IF) transceiver 812, a mmW front end 813, and mmW antennas 814.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

In the illustrated embodiment, the sub mmW transceiver 802, sub mmW front end 803, and sub mmW antennas 804 serve to transmit and receive centimeter waves and other radio frequency signals below millimeter wave frequencies. Additionally, the mmW BB/IF transceiver 812, mmW front end 813, and mmW antennas 814 serve to transmit and receive millimeter waves. Although one specific example is shown, other implementations are possible, including, but not limited to, mobile devices operating using circuitry operating over different frequency ranges.

The sub mmW transceiver 802 generates RF signals for transmission and processes incoming RF signals received from the sub mmW antennas 804. It will be understood that various functionalities associated with the transmission and receiving of RF signals can be achieved by one or more components that are collectively represented in FIG. 11A as the sub mmW transceiver 802. In one example, separate components (for instance, separate circuits or dies) can be provided for handling certain types of RF signals.

The sub mmW front end system 803 aids is conditioning signals transmitted to and/or received from the antennas 804. In the illustrated embodiment, the front end system 803 includes power amplifiers (PAs) 821, low noise amplifiers (LNAs) 822, filters 823, switches 824, and duplexers 825. However, other implementations are possible.

For example, the sub mmW front end system 803 can provide a number of functionalizes, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The sub mmW antennas 804 can include antennas used for a wide variety of types of communications. For example, the sub mmW antennas 804 can include antennas associated transmitting and/or receiving signals associated with a wide variety of frequencies and communications standards.

The mmW BB/IF transceiver 812 generates millimeter wave signals for transmission and processes incoming millimeter wave signals received from the mmW antennas 814. It will be understood that various functionalities associated with the transmission and receiving of RF signals can be achieved by one or more components that are collectively represented in FIG. 11A as the mmW transceiver 812. The mmW BB/IF transceiver 812 can operate at baseband or intermediate frequency, based on implementation.

The mmW front end system 813 aids is conditioning signals transmitted to and/or received from the mmW antennas 814. In the illustrated embodiment, the front end system 803 includes power amplifiers 831, low noise amplifiers 832, switches 833, up converters 834, down converters 835, and phase shifters 836. However, other implementations are possible. In one example, the mobile device 800 operates with a BB mmW transceiver, and up converters and down-converters are omitted from the mmW front end. In another example, the mmW front end further includes filters for filtering millimeter wave signals.

The mmW antennas 814 can include antennas used for a wide variety of types of communications. The mmW antennas 814 can include antenna arrays implemented in a wide variety of ways. Examples of antenna elements for millimeter wave antenna arrays include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can also be implemented to operate with beamforming. For example, the mmW front end system 813 includes phase shifters 836 having variable phase controlled by the transceiver 812. Additionally, the phase shifters can be controlled to provide beam formation and directivity for transmission and/or reception of signals using the mmW antennas 814. For example, in the context of signal transmission, the phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array from a particular direction.

The baseband system 801 is coupled to the user interface 807 to facilitate processing of various user input and output (I/O), such as voice and data. The baseband system 801 provides the sub mmW and mmW transceivers with digital representations of transmit signals, which are processed by the transceivers to generate RF signals for transmission. The baseband system 801 also processes digital representations of received signals provided by the transceivers. As shown in FIG. 11A, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front ends. For example, the power management system 805 can be configured to change the supply voltage(s) provided to one or more of the power amplifiers to improve efficiency, such as power added efficiency (PAE).

As shown in FIG. 11A, the power management system 805 receives a battery voltage form the battery 808. The battery 808 can be any suitable battery for use in the mobile device 800, including, for example, a lithium-ion battery.

Figure 11B:
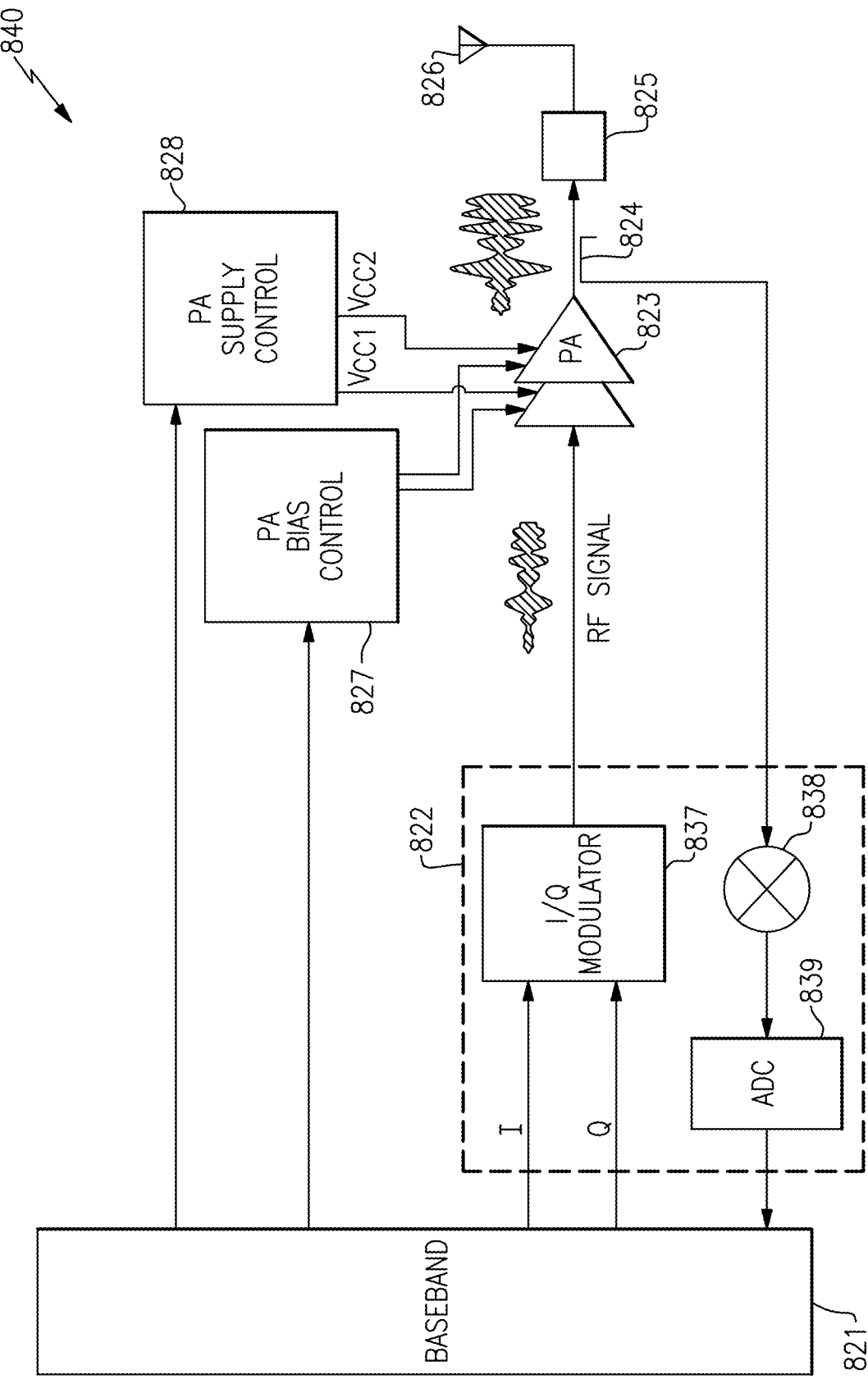
FIG. 11B is a schematic diagram of a power amplifier system according to one embodiment.

FIG. 11B is a schematic diagram of a power amplifier system 840 according to one embodiment. The illustrated power amplifier system 840 includes a baseband processor 821, a transmitter 822, a power amplifier (PA) 823, a directional coupler 824, front-end circuitry 825, an antenna 826, a PA bias control circuit 827, and a PA supply control circuit 828. The illustrated transmitter 822 includes an I/Q modulator 837, a mixer 838, and an analog-to-digital converter (ADC) 839. In certain implementations, the transmitter 822 is included in a transceiver such that both transmit and receive functionality is provided.

The baseband processor 821 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 837 in a digital format. The baseband processor 821 can be any suitable processor configured to process a baseband signal. For instance, the baseband processor 821 can include a digital signal processor, a microprocessor, a programmable core, or any combination thereof. Moreover, in some implementations, two or more baseband processors 821 can be included in the power amplifier system 840.

The I/Q modulator 837 can be configured to receive the I and Q signals from the baseband processor 821 and to process the I and Q signals to generate an RF signal. For example, the I/Q modulator 837 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 823. In certain implementations, the I/Q modulator 837 can include one or more filters configured to filter frequency content of signals processed therein.

The power amplifier 823 can receive the RF signal from the I/Q modulator 837, and when enabled can provide an amplified RF signal to the antenna 826 via the front-end circuitry 825. An amplified RF signal from a power amplifier is also referred to herein as an RF transmit signal.

The front-end circuitry 825 can be implemented in a variety of ways. In one example, the power amplifier 823 can provide the amplified RF signal to the antenna 826 through one or more switches, filters, duplexers, multiplexers, and/or other components. In another example, the front-end circuitry 825 is omitted in favor of the power amplifier 823 providing the amplified RF signal directly to the antenna 826.

The directional coupler 824 senses an output signal of the power amplifier 823. Additionally, the sensed output signal from the directional coupler 824 is provided to the mixer 838, which multiplies the sensed output signal by a reference signal of a controlled frequency. The mixer 838 operates to generate a downshifted signal by downshifting the sensed output signal's frequency content. The downshifted signal can be provided to the ADC 839, which can convert the downshifted signal to a digital format suitable for processing by the baseband processor 821. Including a feedback path from the output of the power amplifier 823 to the baseband processor 821 can provide a number of advantages. For example, implementing the baseband processor 821 in this manner can aid in providing power control, compensating for transmitter impairments, and/or in performing digital pre-distortion (DPD). Although one example of a sensing path for a power amplifier is shown, other implementations are possible.

The PA supply control circuit 828 receives a power control signal from the baseband processor 821, and controls supply voltages of the power amplifier 823. In the illustrated configuration, the PA supply control circuit 828 generates a first supply voltage $V_{CC1}$ for powering an input stage of the power amplifier 823 and a second supply voltage $V_{CC2}$ for powering an output stage of the power amplifier 823. The PA supply control circuit 828 can control the voltage level of the first supply voltage $V_{CC1}$ and/or the second supply voltage $V_{CC2}$ to enhance the power amplifier system's PAE.

The PA supply control circuit 828 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 828 is a multi-mode supply control circuit that can operate in multiple supply control modes including an APT mode and an ET mode. For example, the power control signal from the baseband processor 821 can instruct the PA supply control circuit 828 to operate in a particular supply control mode.

As shown in FIG. 11B, the PA bias control circuit 827 receives a bias control signal from the baseband processor 821, and generates bias control signals for the power amplifier 823. In the illustrated configuration, the bias control circuit 827 generates bias control signals for both an input stage of the power amplifier 823 and an output stage of the power amplifier 823. However, other implementations are possible.

Figure 12A:
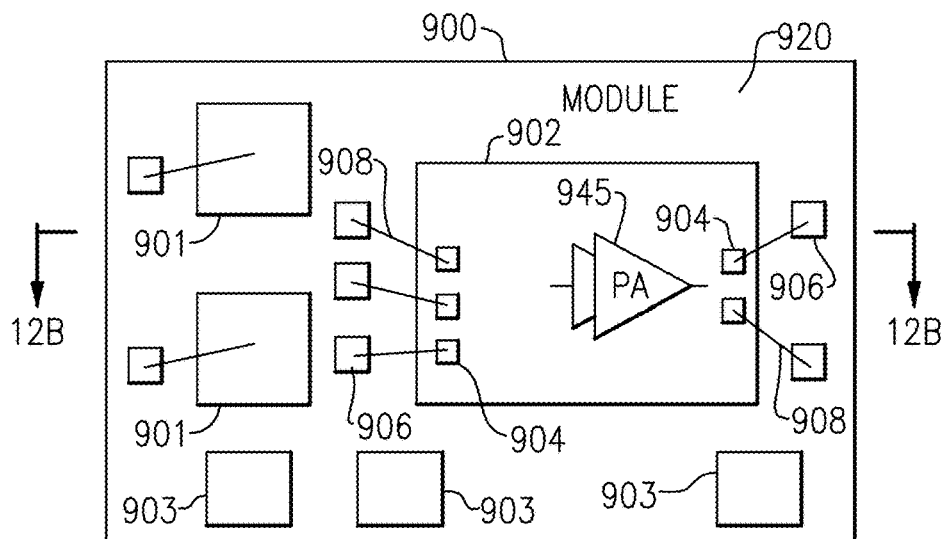
FIG. 12A is a schematic diagram of one embodiment of a packaged module.
Figure 12B:
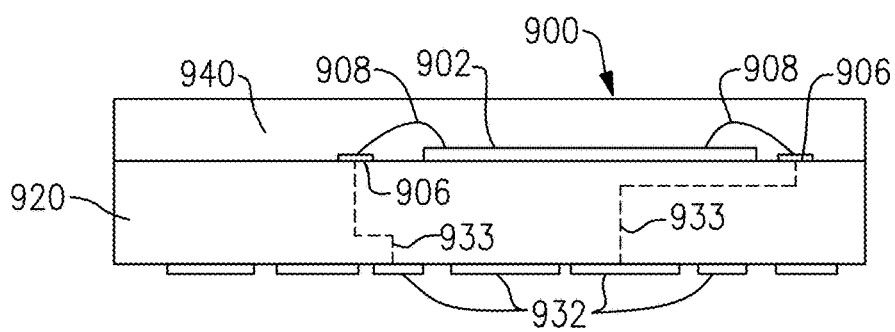
FIG. 12B is a schematic diagram of a cross-section of the packaged module of FIG. 12A taken along the lines 12B-12B.

FIG. 12A is a schematic diagram of one embodiment of a packaged module 900. FIG. 12B is a schematic diagram of a cross-section of the packaged module 900 of FIG. 12A taken along the lines 12B-12B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes a power amplifier 945, which can be implemented in accordance with one or more features disclosed herein.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 12B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 12B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Figure 13:
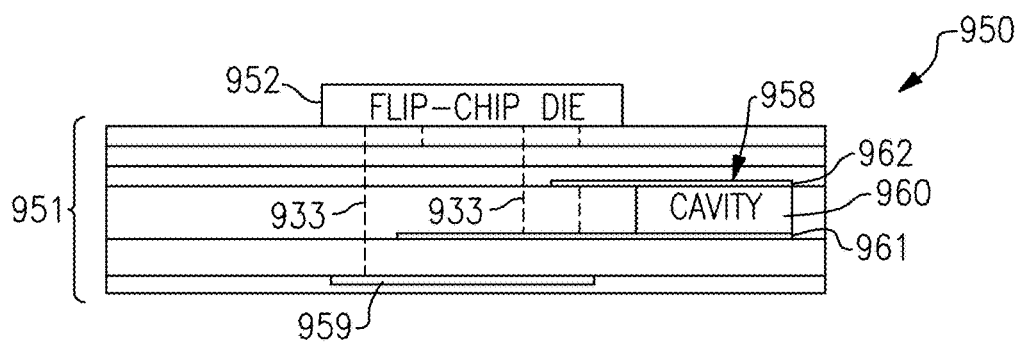
FIG. 13 is a schematic diagram of a cross-section of another embodiment of a packaged module.

FIG. 13 is a schematic diagram of a cross-section of another embodiment of a packaged module 950. The packaged module 950 includes a laminated package substrate 951 and a flip-chip die 952.

The laminated package substrate 951 includes a cavity-based antenna 958 associated with an air cavity 960, a first conductor 961, a second conductor 962. The laminated package substrate 951 further includes a planar antenna 959.

In certain implementations herein, a packaged module includes one or more integrated antennas. For example, the packaged module 950 of FIG. 13 includes the cavity-based antenna 958 and the planar antenna 959. Although one example of a packaged module with integrated antennas is shown, the teachings herein are applicable to modules implemented in a wide variety of ways.

Various RF electronics can incorporate one or more features described herein. For example, a wide range of RF communication systems can be implemented to change a type of waveform used for transmission in response to a decrease in a signal-to-noise ratio of a TDD communication link, and to boost a power of the radio frequency transmit signal by an amount based on the duty cycle of the TDD communication link. Implementing an RF communication system with a duty cycle dependent power boost can provide a number of advantages, including, but not limited to, longer communication range, transmission with higher power added efficiency (PAE), extended battery life, and/or improving communications in noisy radio environments.

CONCLUSION

Some of the embodiments described above have provided examples of dynamic beam control in connection with wireless communication devices. However, the principles and advantages of the embodiments can be used for any other systems or apparatus that benefit from any of the circuits and systems described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
   an antenna configured to transmit a radio frequency signal over a time-division duplex communication link having a duty cycle and a signal-to-noise ratio;
   a baseband processor configured to generate digital data representing the radio frequency signal, and to select a waveform type of the radio frequency signal based on the signal-to-noise ratio of the time-division duplex communication link;
   a transceiver configured to generate the radio frequency signal based on the digital data; and
   a front end system including a power amplifier configured to amplify the radio frequency signal by an amount based on the duty cycle of the time-division duplex communication link.

2. The mobile device of claim 1 wherein the baseband processor is configured to change the waveform type from a first waveform type to a second waveform type in response to a decrease in the signal-to-noise ratio of the time-division duplex communication link, the second waveform type having lower peak to average power ratio than the first waveform type.

3. The mobile device of claim 2 wherein the second waveform type includes discrete Fourier transformation spreading and the first waveform type includes a cyclic prefix coding.

4. The mobile device of claim 2 wherein the first waveform type is modulated with quadrature phase shift keying and the second waveform type is modulated with binary phase shift keying.

5. The mobile device of claim 1 wherein the time-division duplex communication link includes a plurality of available transmit frames, the baseband processor configured to control a number of utilized transmit frames in which the radio frequency signal is transmitted.

6. The mobile device of claim 5 wherein the amount of amplification is based on the number of utilized transmit frames.

7. The mobile device of claim 1 wherein the amount of amplification is further based on a specific absorption rate value.

8. A method of wireless communication in a mobile device, the method comprising:
   generating digital data representing a radio frequency signal using a baseband processor;
   generating the radio frequency signal based on the digital data using a transceiver;
   transmitting the radio frequency signal over a time-division duplex communication link using an antenna, the time-division duplex communication link having a duty cycle and a signal-to-noise ratio;
   selecting a waveform type of the radio frequency signal based on the signal-to-noise ratio of the time-division duplex communication link using the baseband processor; and
   amplifying the radio frequency signal using a power amplifier, an amount of amplification provided by the power amplifier based on the duty cycle of the time-division duplex communication link.

9. The method of claim 8 wherein selecting the waveform type includes changing the waveform type from a first waveform type to a second waveform type in response to a decrease in the signal-to-noise ratio of the time-division duplex communication link, the second waveform type having lower peak to average power ratio than the first waveform type.

10. The method of claim 9 wherein the second waveform type includes discrete Fourier transformation spreading and the first waveform type includes a cyclic prefix coding.

11. The method of claim 9 wherein the first waveform type is modulated with quadrature phase shift keying and the second waveform type is modulated with binary phase shift keying.

12. The method of claim 8 wherein the time-division duplex communication link includes a plurality of available transmit frames, the method further comprising controlling a number of utilized transmit frames in which the radio frequency signal is transmitted using the baseband processor.

13. The method of claim 12 wherein the amount of amplification is based on the number of utilized transmit frames.

14. The method of claim 9 wherein the amount of amplification is further based on a specific absorption rate value.

15. A power amplifier system comprising:
an antenna configured to transmit a radio frequency signal over a time-division duplex communication link having a duty cycle and a signal-to-noise ratio;
a power amplifier configured to amplify the radio frequency signal by an amount based on the duty cycle of the time-division duplex communication link; and
a radio frequency transmitter configured to generate the radio frequency signal, and to select a waveform type of the radio frequency signal based on the signal-to-noise ratio of the time-division duplex communication link.

16. The power amplifier system of claim 15 wherein the radio frequency transmitter is configured to change the waveform type from a first waveform type to a second waveform type in response to a decrease in the signal-to-noise ratio of the time-division duplex communication link, the second waveform type having lower peak to average power ratio than the first waveform type.

17. The power amplifier system of claim 16 wherein the second waveform type includes discrete Fourier transformation spreading and the first waveform type includes a cyclic prefix coding.

18. The power amplifier system of claim 16 wherein the first waveform type is modulated with quadrature phase shift keying and the second waveform type is modulated with binary phase shift keying.

19. The power amplifier system of claim 15 wherein the time-division duplex communication link includes a plurality of available transmit frames, the baseband processor configured to control a number of utilized transmit frames in which the radio frequency signal is transmitted.

20. The power amplifier system of claim 19 wherein the amount of amplification is based on the number of utilized transmit frames.

* * * * *